(12) United States Patent
Aiso

(10) Patent No.: US 7,483,051 B2
(45) Date of Patent: Jan. 27, 2009

(54) IMAGE DATA GENERATION SUITED FOR OUTPUT DEVICE USED IN IMAGE OUTPUT

(75) Inventor: Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 695 days.

(21) Appl. No.: 11/065,870

(22) Filed: Feb. 24, 2005

(65) Prior Publication Data

US 2005/0212923 A1   Sep. 29, 2005

(30) Foreign Application Priority Data

Mar. 2, 2004 (JP) ............................. 2004-057160

(51) Int. Cl.
*H04N 5/225* (2006.01)
*H04N 5/228* (2006.01)

(52) U.S. Cl. .................. 348/207.2; 348/222.1

(58) Field of Classification Search ................ 349/239, 349/333.01–333.05, 231.99, 207.2, 222.1; 382/300

See application file for complete search history.

(56) References Cited

U.S. PATENT DOCUMENTS 5,875,268 A * 2/1999 Miyake .................. 382/276
6,603,506 B2 * 8/2003 Ogawa et al. ............ 348/207.2
6,804,419 B1 * 10/2004 Miyake ................... 382/300
7,253,917 B2 * 8/2007 Umeda et al. ............ 358/1.15
2004/0196376 A1 * 10/2004 Hosoda et al. ........... 348/207.1

FOREIGN PATENT DOCUMENTS

JP   2000-244851   9/2000

OTHER PUBLICATIONS

Abstract of Japanese Patent Publication No. 2000-244851, Pub. Date: Sep. 8, 2000, Patent Abstracts of Japan.

* cited by examiner

*Primary Examiner*—Tuan Ho
*Assistant Examiner*—Tuan H Le
(74) *Attorney, Agent, or Firm*—Martine Penilla & Gencarella, LLP

(57) ABSTRACT

An image generation device generates high-definition image data representing a high-definition image higher in definition than images represented by a plurality of image data. This device comprises a target image size setting module and an image composing module. The target image size setting module acquires output device information relating to an output device used in output of the high-definition image, and sets a target image size expressed with number of pixels of the high-definition image suited for outputting by the output device based on the output device information. The image composing module selects a plurality of source image data arranged in a time sequence from the plurality of image data, and composes the source image data to generate high-definition image data representing a high-definition image with the target image size.

13 Claims, 18 Drawing Sheets

● PIXEL FOR HIGH-DEFINITION IMAGE Gp

◇ PIXEL FOR BASIS FRAME IMAGE F0

▥ PIXEL FOR SUBJECT FRAME IMAGE F1

▨ PIXEL FOR SUBJECT FRAME IMAGE F2

Fig.14

HIGH-DEFINITION PROCESSING
SPECIFICATION INFORMATION

| ITEM | DETAILS |
|---|---|
| IMAGE PROCESSING NAME INFORMATION | • HIGH-DEFINITION PROCESSING |
| COMPOSITION SOURCE IMAGE DATA SPECIFICATION INFORMATION | • SOURCE MOVING IMAGE DATA NAME<br>• SOURCE MOVING IMAGE DATA CREATION DATE AND TIME<br>• FRAME IMAGE SIZE<br>• ABSOLUTE FRAME NUMBER FOR BASIS FRAME IMAGE DATA<br>• ABSOLUTE FRAME NUMBER FOR SUBJECT FRAME IMAGE DATA |
| IMAGE PROCESSING SETTING INFORMATION | • NUMBER OF COMPOSITION FRAME IMAGES<br>• TARGET IMAGE SIZE |

Fig.15

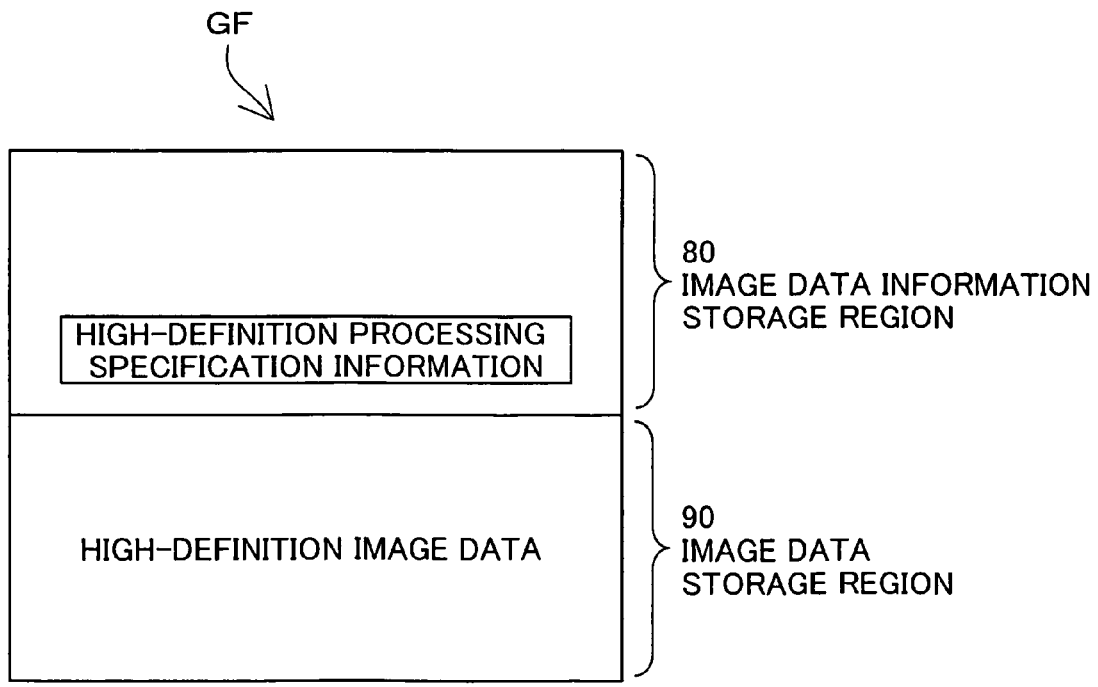

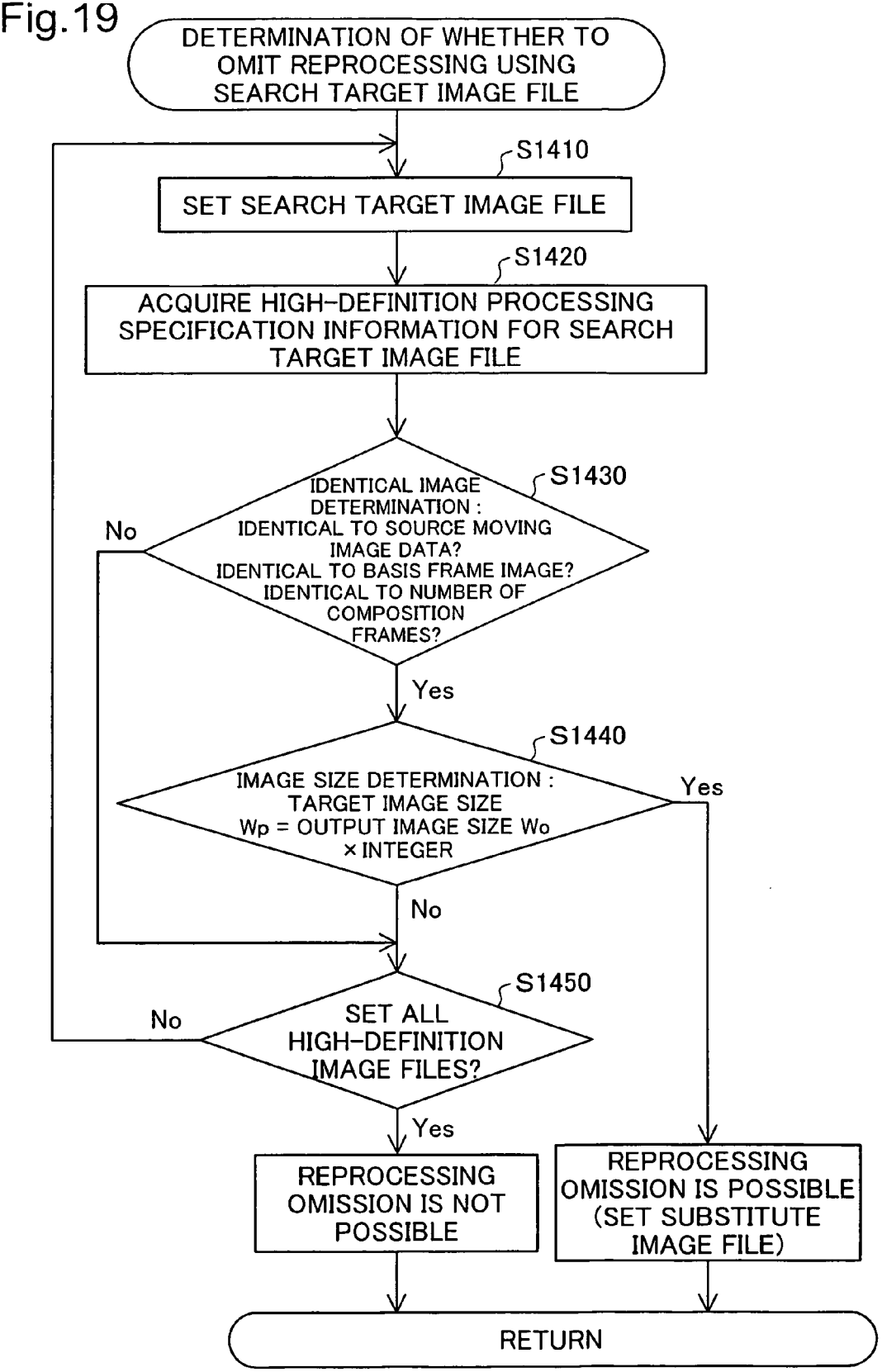

IMAGE DATA GENERATION SUITED FOR OUTPUT DEVICE USED IN IMAGE OUTPUT

CROSS REFERENCE TO RELATED APPLICATIONS

The present application claims the priority based on Japanese Patent Application No. 2004-57160 filed on Mar. 2, 2004, the disclosure of which is hereby incorporated herein by reference in its entirety.

BACKGROUND OF THE INVENTION

1. Field of the Invention

The present invention relates to technology for generating high-definition image data suitable for an output device used in image output.

2. Description of the Related Art

Moving images generated by a moving image generation device such as a digital video camera are constituted of a plurality of comparatively small-sized images (for example, frame images). Herein, the expression "image size" of an image means the number of pixels constituting the image. Size of an image is represented as Wx×Wy where Wx is the number of pixels in the horizontal direction of the image, and Wy is the number of pixels in the vertical direction.

A technology is known for using image data representing an source image composing such a moving image to generate high-definition image data representing a high-definition image higher in definition than the source image (e.g. JP2000-244851A). In the present specification, "high definition" or "high resolution" means a small pixel pitch, and "low definition" or "low resolution" means a large pixel pitch. With such technology, it is possible to arbitrarily set size of the high-definition image to be generated.

When a high-definition image generated using the above-mentioned technology is printed with a printer, if image size of the generated high-definition image differs from image size suited for printing with the printer determined somewhat from the printer's printing resolution, print medium size, or the like, image size conversion processing is carried out. When image size conversion processing is carried out at the time of printing with the printer, there is a tendency for the image quality of the print image to decrease due to interpolation processing and the like. There was thus the problem that size of the high-definition image to be generated might invite a decrease in image quality during printer output.

Such a problem is not limited to printing with a printer, but is common to cases where a high-definition image is outputted with an output device. Such a problem is also not limited to image data constituting moving images, but is common to cases where high-definition pixel data is generated from a plurality of image data.

SUMMARY OF THE INVENTION

An object of the present invention is to provide technology with which image data can be generated in which a decrease in image quality is suppressed during output of a high-definition image to be generated in the process for generating high-definition image data representing a high-definition image from a plurality of image data.

In one aspect of the present invention, an image generation device generates high-definition image data representing a high-definition image higher in definition than images represented by a plurality of image data. This device comprises a target image size setting module and an image composing module. The target image size setting module acquires output device information relating to an output device used in output of the high-definition image, and sets a target image size expressed with number of pixels of the high-definition image suited for outputting by the output device based on the output device information. The image composing module selects a plurality of source image data arranged in a time sequence from the plurality of image data, and composes the source image data to generate high-definition image data representing a high-definition image with the target image size.

This image generation device can set image size of a high-definition image suited for output with an output device as a target image size based on output device information of the output device used for output of high-definition image data during high-definition image generation processing for generating the high-definition image data representing the high-definition image. So it is possible to generate image data in which a drop in image quality is controlled at the time of outputting the generated high-definition image.

The present invention can be realized in a various aspects. For example, the present invention can be realized in aspects such as an image generation method and image generation device, an image data processing method and image data processing device, an image conversion method and image conversion device, an image output method and image output device, an image search method and image search device, a computer program for effecting the functions of such methods or devices, a recording medium for recording such a computer program, and data signals in which such a computer program is carried on the carrier wave.

These and other objects, features, aspects, and advantages of the present invention will become more apparent from the following detailed description of the preferred embodiments with the accompanying drawings.

BRIEF DESCRIPTION OF THE DRAWINGS

FIG. 14 is an explanatory diagram showing in outline the contents of the high-definition processing specification information.

FIG. 15 is an explanatory diagram showing in outline an example of the internal composition of the high-definition image file.

FIG. 19 is a flowchart showing the flow of processing for the reprocessing omission determination using the search target image file.

DESCRIPTION OF THE PREFERRED EMBODIMENT

Next, aspects of the present invention will be described in the following order on the basis of embodiments:

A. Embodiment 1

A-1. Structure of the Image Generation Device
A-2. Summary of Image Generation Processing
A-3. High-Definition Image Data Generation
A-4. Image Composition B. Embodiment 2

C. Modifications

A. Embodiment 1

A-1. Structure of the Image Generation Device

Figure 1:
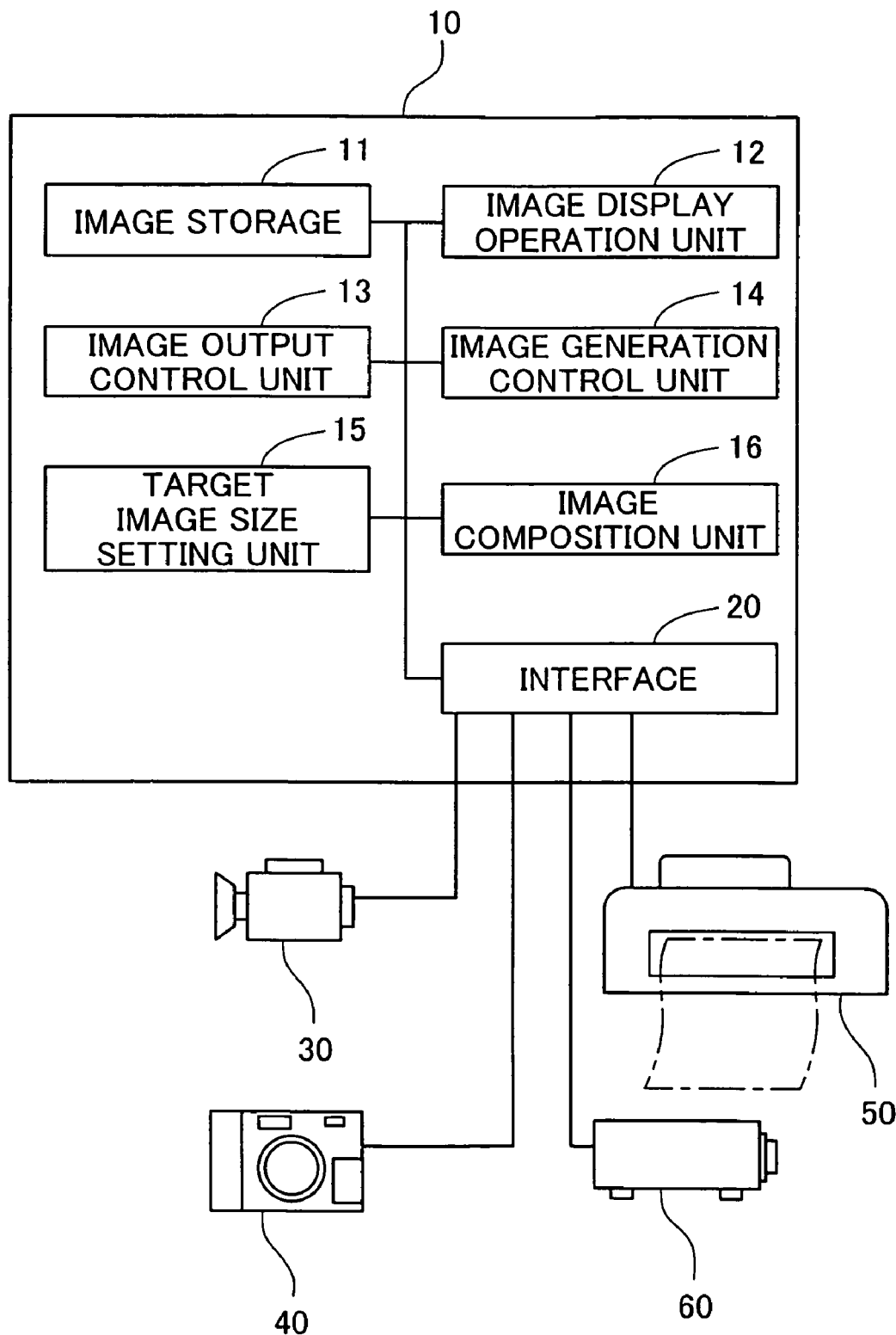
FIG. 1 is an explanatory diagram showing structure of an image generation device as Embodiment 1 of the present invention.

FIG. 1 is an explanatory diagram showing the structure of an image generation device as embodiment 1 of the present invention. This image generation device 10 comprises an image storage 11 for storing image data, an image display operation unit 12 having a display screen for displaying images and buttons for a user to carry out various operations, an image output control unit 13 for controlling output of images to an output device, and an interface 20 for connecting to external devices. The image generation device 10 can acquire image data such as still image data and moving image data from image input devices such as a digital video camera 30 or digital still camera 40 connected through the interface 20 in response to an operation of the image display operation unit 12 by the user, and store the image data in the image storage 11. The image output control unit 13 can display images represented by image data stored in the image storage 11 on the image display operation unit 12 as well as output the image to an image output device such as a printer 50 or projector 60 connected through the interface 20. As described above, the image generation device 10 functions as a so-called "photo viewer".

The image generation device 10 can acquire image data from other recording media such as a hard disk drive, CD-R/RW drive, DVD drive, or the like in a computer. The image generation device 10 can also output images to other output devices such as a monitor and a television receiver. The image generation device 10 may further comprise a keyboard or mouse for the user to input various instructions.

The image generation device 10 carries out high-definition image data generation by executing an application program for generating high-definition image data on a predetermined operating system. This high-definition image data generation is processing for generating high-definition image data representing a high-definition image, which is a still image higher in definition than frame images represented by frame image data, from a plurality of frame image data constituting moving image data stored in the image storage 11. The image generation device 10 references the output image size set based on information related to the output device used in outputting the high-definition image to be generated (referred to as the "output device information" in the present specification), and sets the image size of the high-definition image suited to output by the output device as the target image size. The application program has functions as an image generation control unit 14, a target image size setting unit 15, and an image composition unit 16.

The image generation device 10 can store high-definition image data generated in the high-definition image data generation processing in the image storage 11. The image generation device 10 can also display represented by high-definition image data stored in the image storage 11 on the image display operation unit 12, and output the high-definition images to an output device such as the printer 50 or the projector 60.

Figure 2:
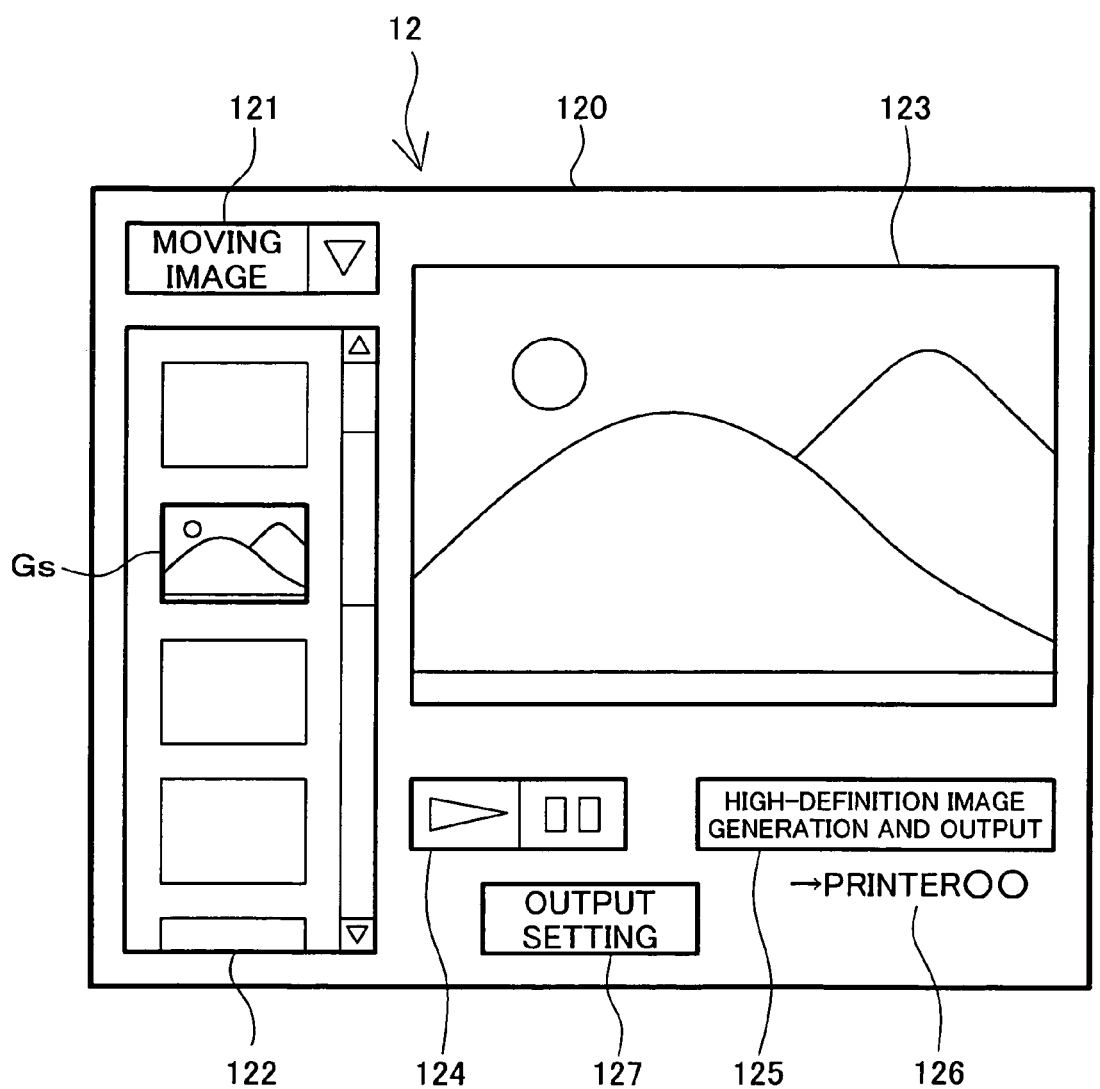
FIG. 2 is an explanatory diagram showing an example of a display screen in the image display operation unit.

FIG. 2 is an explanatory diagram showing an example of a display screen in the image display operation unit. The image display operation unit 12 comprises a touch panel type display screen 120, and can display images represented by still image data or moving image data on the display screen 120. The user can also carry out a variety of operations by touching prescribed positions on the display screen 120. The display screen 120 of the image display operation unit 12 can display an image data type window 121, an image list window 122, an image display window 123, a moving image operation button 124, a high-definition image generation and output button 125, an output device display window 126, and an output setting button 127.

The image data type window 121 displays the type of image data for displaying a thumbnail image on the image list window 122 from image data stored in the image storage 11. Here, types of image data are moving image data and still image data, with still image data including high-definition image data generated by high-definition image data generation. The user can set display of the image data type window 121 to any of "moving images", "still images", "high-definition images", and "all images" by operating the image data type window 121. Thumbnail images of the image data with the set image type are displayed on the image list window 122 in response to the setting of the image data type window 121 by the user. In the example in FIG. 2, thumbnail images for all the moving image data stored in the image storage 11 are displayed in the image list window 122 because "moving image" is selected on the image data type window 121.

A thumbnail image of an arbitrary one of frame images in the moving image can be used for the thumbnail image of the moving image data, but in the present embodiment, the thumbnail image of the first frame image in the moving image is used. Also, in the present embodiment, thumbnail images are displayed in the image list window 122, but it is also possible to display the still image itself that is represented by the still image data or the frame image itself that is represented by arbitrary frame image data in the moving image data on the image list window 122.

The user can view the thumbnail images displayed in the image list window 122, select an image desired for display on the image display window 123, and have the selected image displayed on the image display window 123. In the example of FIG. 2, the image surrounded with the bold frame has been selected by the user, and this selected image (hereinafter, referred to as the "selection image Gs") is displayed large on the image display window 123. When the selected image Gs is a moving image, it is possible to display an arbitrary frame image from the moving image on the image display window 123, but in the present embodiment, the initial frame image in the moving image is displayed.

When the selected image Gs is a moving image, the user can operate the moving image operation button 124 to play back the moving image on the image display window 123, or to pause the playback.

Also, when the selected image Gs is a moving image, the user can operate the high-definition image generation and output button 125 to cause high-definition image data generation processing to generate high-definition image data, and can have the high-definition image generated by the high-definition image data generation outputted to an output device connected to the image generation device 10. It is also possible to have a generated high-definition image displayed on the image display window 123.

The output device display window 126 displays the output device connected to the image generation device 10 for outputting images. The user can operate the output setting button 127 to make various settings for output to the output device.

A-2. Summary of Image Generation Processing

Figure 3:
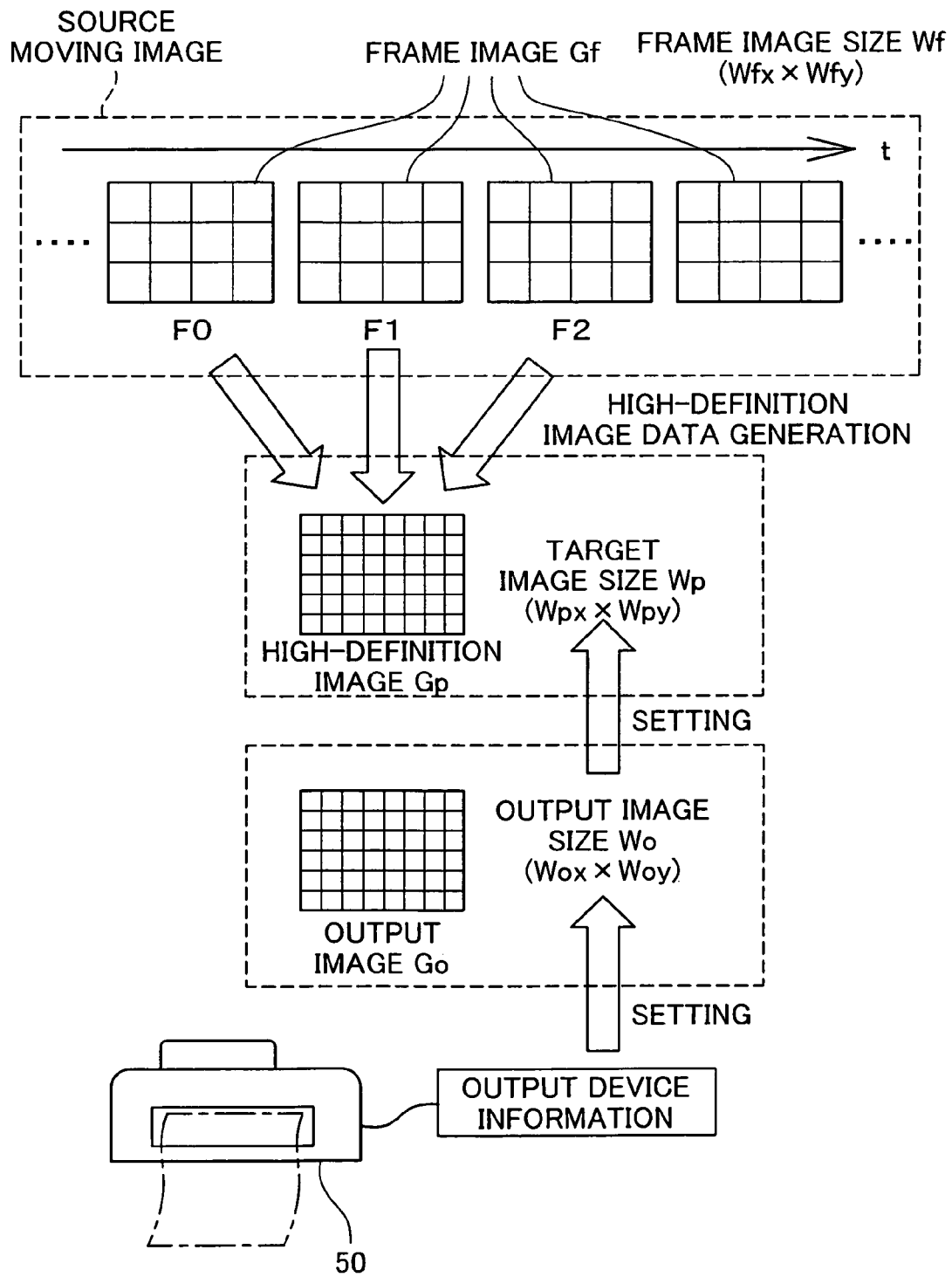
FIG. 3 is an explanatory diagram showing an outline of processing for high-definition image data generation by the image generation device.

FIG. 3 is an explanatory diagram showing an outline of processing for high-definition image data generation by the image generation device. The image generation device 10 (FIG. 1) carries out high-definition image data generation processing to generate high-definition image data representing the high-definition image Gp by composing a plurality of frame image data representing a plurality of frame images Gf in a moving image. In the present specification, the moving image used in the processing of high-definition image data generation is referred to as the "source moving image", and the moving image data representing the source moving image is called the "source moving image data". In the top section of FIG. 3, a plurality of frame images Gf arranged in a time series are shown that constitute a source moving image. The plurality of frame images Gf are lined up in a chronological sequence from left to right in the drawing. The image size of each frame image Gf (frame image size Wf) is represented by Wfx×Wfy.

Also in the top section of FIG. 3, one frame image used as the image composition basis (basis frame image F0) and a frame image that is the subject of composition (subject frame images F1 and F2) are shown. In the present embodiment, two frame images immediately after the basis frame image F0 are used as the subject frame images, but the number of subject frame images and their selection method may be set arbitrarily.

The image generation device 10 (FIG. 1) carries out high-definition image data generation processing using basis frame image data and subject frame image data. "Basis frame image data" means frame image data representing the basis frame image F0 and "subject frame image data" means frame image data representing the subject frame images F1 and F2. In the present specification, the basis frame image data and the subject frame image data are collectively called as "composition source frame image data".

In the present embodiment, when the user operates the high-definition image generation and output button 125 (FIG. 2) during playback of the moving image, the frame image displayed in the image display window 123 (FIG. 2) is set as the basis frame image F0. Also the two frame images immediately after the basis frame image F0 are set as the subject frame images F1 and F2.

In the center section of FIG. 3, a high-definition image Gp generated by high-definition image data generation processing is shown. The image size of the high-definition image Gp (target image size Wp) is larger than the frame image size Wf That is, the high-definition image Gp has higher definition than the frame image Gf.

The image generation device 10 sets the image size of the high-definition image Gp suited to output with an output device as the target image size Wp, referring to the output image size Wo set based on the output device information of the output device used in outputting the high-definition image Gp. FIG. 3 shows a state where the image size used in outputting to the printer 50 (output image size Wo) has been set based on output device information of the printer 50 used in outputting, and where the target image size Wp has been set with reference to the output image size Wo. When being outputted to an output device, the high-definition image Gp is converted to an output image Go with an output image size Wo and then outputted.

The content of high-definition image data generation processing by the image generation device 10 is described in detail below.

A-3. High-Definition Image Data Generation

Figure 4:
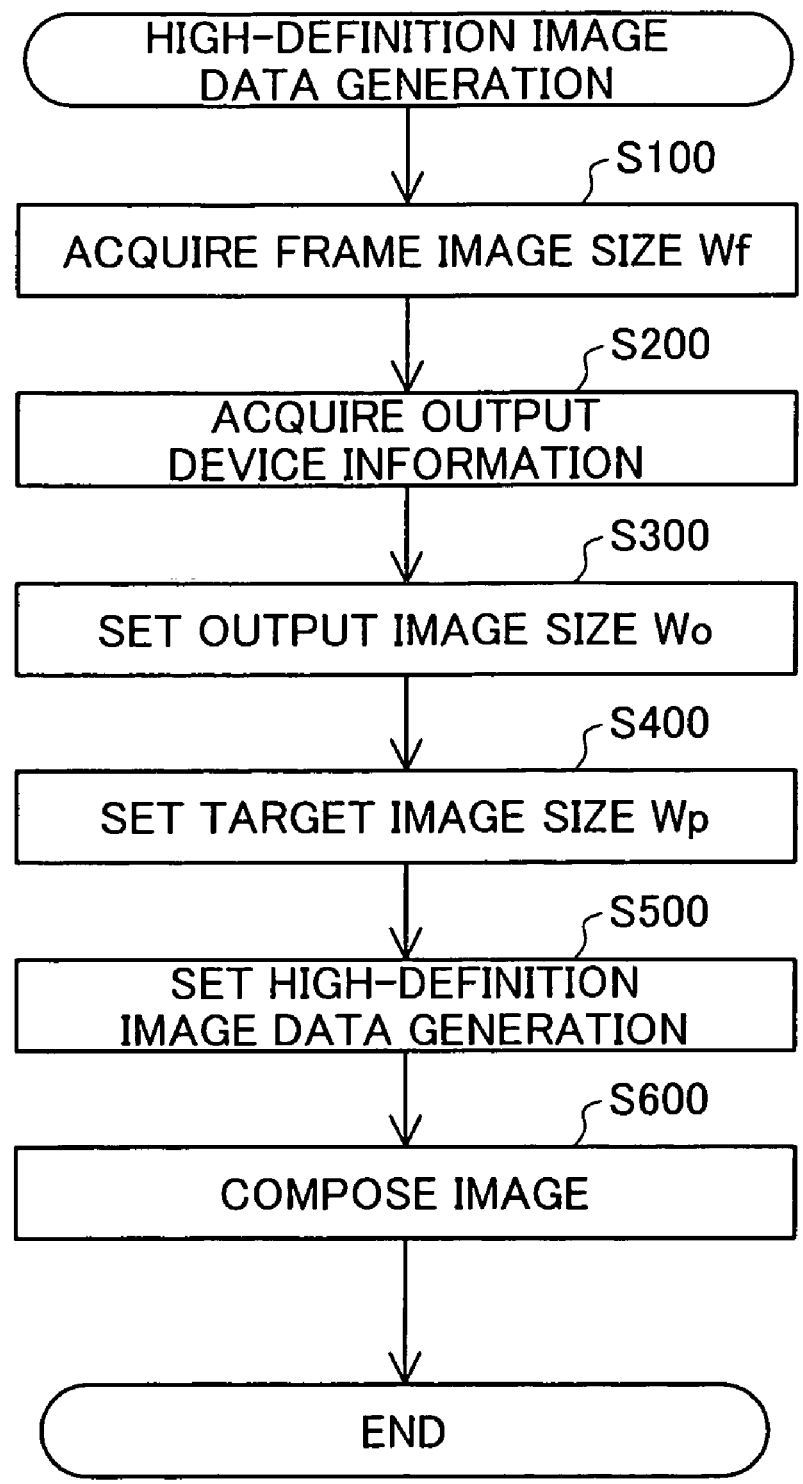
FIG. 4 is a flowchart showing the flow of high-definition image data generation processing carried out by an image generation device.

FIG. 4 is a flowchart showing the flow of high-definition image data generation processing carried out by an image generation device. In step S100, an image generation control unit 14 (FIG. 1) of the image generation device 10 acquires the frame image size Wf of the frame image Gf constituting the source moving image. The frame image size Wf can be acquired by referring to the header of the source moving image data stored in the image storage 11 (FIG. 1). Also, the user can operate the image display operation unit 12 (FIG. 1) to input the frame image size Wf In step S200, the target image size setting unit 15 (FIG. 1) acquires output device information. Here, output device information is that relating to the output device used in outputting the high-definition image generated in the high-definition image data generation processing, and includes items in common regardless of the type of the output device as well as device-specific items that differ depending on the type of output device. Common items include the type of output device such as printer or projector, and the output device model number. Device-specific items include the print resolution, paper size, and number of print pixels per image pixel in cases where the output device is a printer, and the projector image size in cases where the output device is a projector. In the present specification, "print resolution" means the number of print image pixels per length unit of the print medium. Also, the "number of print pixels per image pixel" means the number of print pixels used for outputting one pixel in a given image. Also, "projector image size" means the image size that can be outputted by the projector.

Acquiring output device information by the target image size setting unit 15 (FIG. 1) can be carried out through communication between the image generation device 10 (FIG. 1) and the output device. In further detail, the target image size setting unit 15 detects the output device set at the output destination connected to the image generation device 10, and the output device information having the detected output device can be acquired through a connection cable. With this process, no user operation is required, and it is possible to improve the operability of the image generation device 10. This also allows the image generation device 10 to acquire the output device information reliably.

If only a portion of the output device information can be acquired through communication between the image generation device 10 and the output device, the target image size setting unit 15 may automatically set the output device information that could not be acquired. For example, if the output device is a printer, and the print resolution in the output device information cannot be obtained, the target image size setting unit 15 can refer to the acquired model number of the printer and automatically set the print resolution to the maximum value that printer has. In general, the setting value of the image size of a projector and the print resolution that an output device has is an integral fraction of the maximum value. Accordingly, if the projector image size in the case of a projector or the print resolution in the case of a printer cannot be acquired, if the maximum value the output device has is automatically set, the processing converts the image size to an integral fraction even if image size conversion is required later, so a decrease in quality is kept to a minimum.

Also, if the user operates the image display operation unit 12 (FIG. 1) to input the output device information to the image generation device 10, the target image size setting unit 15 can acquire the output device information.

In step S300, the target image size setting unit 15 (FIG. 1) sets the output image size Wo based on the output device information. The output image size Wo is the size of the image used for output to the output device. The setting of the output image size Wo differs depending on the type of output device used for outputting the high-definition image.

Figure 5:
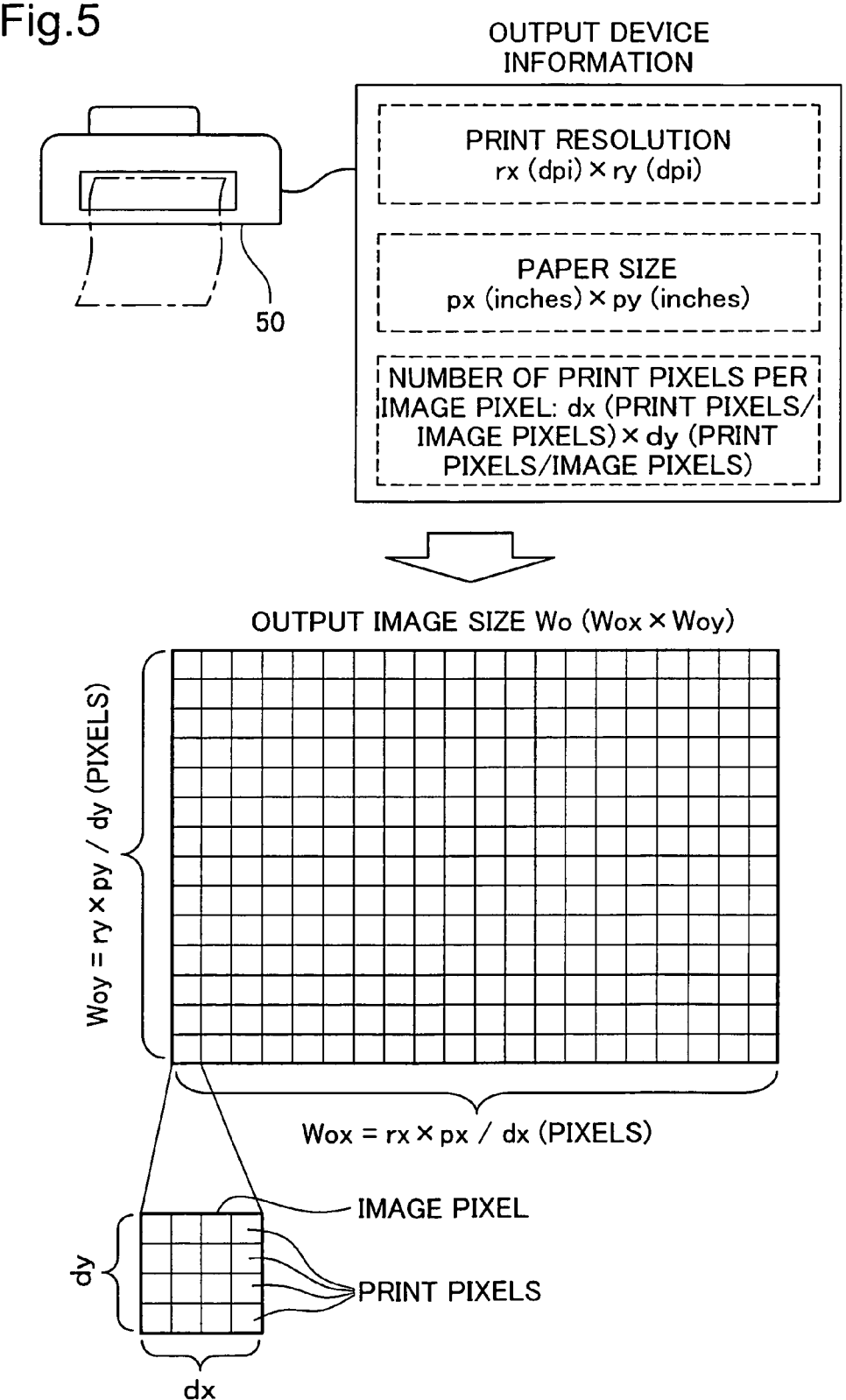
FIG. 5 is an explanatory diagram showing in outline the processing for setting the output image size Wo based on the output device information when the output device is a printer.

FIG. 5 is an explanatory diagram showing in outline the processing for setting the output image size Wo based on the output device information when the output device is a printer. If the output device is a printer, the print resolution, paper size, and number of print pixels per image pixel are acquired as the output device information. Here, the print resolution is represented by rx (dpi) in the horizontal direction and ry (dpi) in the vertical direction, the paper size by px (inches) in the horizontal direction and py (inches) in the vertical direction, and the number of print pixels per image pixel by dx (print pixels/image pixels) in the horizontal direction and dy (print pixels/image pixels) in the vertical direction.

The output image size Wo (Wox×Woy) of the printer is set as the value found by multiplying the print resolution by paper size and dividing that by the number of print pixels per image pixel. In further detail, the output image size Wo is represented by the following formulas.

$Wox = rx \times px/dx$ (pixels)

$Woy = ry \times py/dy$ (pixels)

If the output device is a projector, the projector image size is acquired as the output device information. As described above, the projector image size means the size that can be output by the projector, so the projector output image size Wo is set to the same value as the projector image size.

In steps S400 (FIG. 4), the target image size setting unit 15 (FIG. 1) sets the target image size Wp. This target image size Wp is the image size of the high-definition image Gp generated by high-definition image data processing.

Here, it is desirable as a rule to set the target image size Wp equivalent to the output image size Wo in the high-definition image data generation processing. The reason for that is that if the target image size Wp is set equivalent to the output image size Wo, image size conversion processing by the output device is not required when the high-definition image Gp is outputted, making it possible to suppress a decrease in quality of the high-definition image Gp in the output process. This is also because doing so results in faster output processing. In the present specification, "image size conversion processing by the output device" means processing for converting the image data with the output device driver such that the size of the image represented by the inputted image data is expanded or reduced.

In high-definition image data generation processing, when the ratio of the target image size Wp to the frame image size Wf of the source moving image (Wp/Wf) is at or above a predetermined value, there may be obtained only a slight effect of an increase in image quality even if the target image size Wp is set to a larger value because the errors accompanying pixel interpolation increase. Also, the time required for high-definition image data generation processing increases to the extent that the target image size Wp is set to a large value. Accordingly, there are cases where no substantial effect is obtained in improving the image quality appropriate to the processing content and time when the output image size Wo is relatively large and the target image size Wp is set equivalent to its output image size Wo.

Because of this, the target image size setting unit 15 refers to the set output image size Wo and sets the target image size Wp. Then, the target image size setting unit 15 calculates the ratio of the output image size Wo to the frame image size Wf (Wo/Wf) as the output image size ratio rWo, determines whether the value of the output image size ratio rWo is smaller than a predetermined threshold, and sets the target image size Wp according to the results of the determination.

Figure 6:
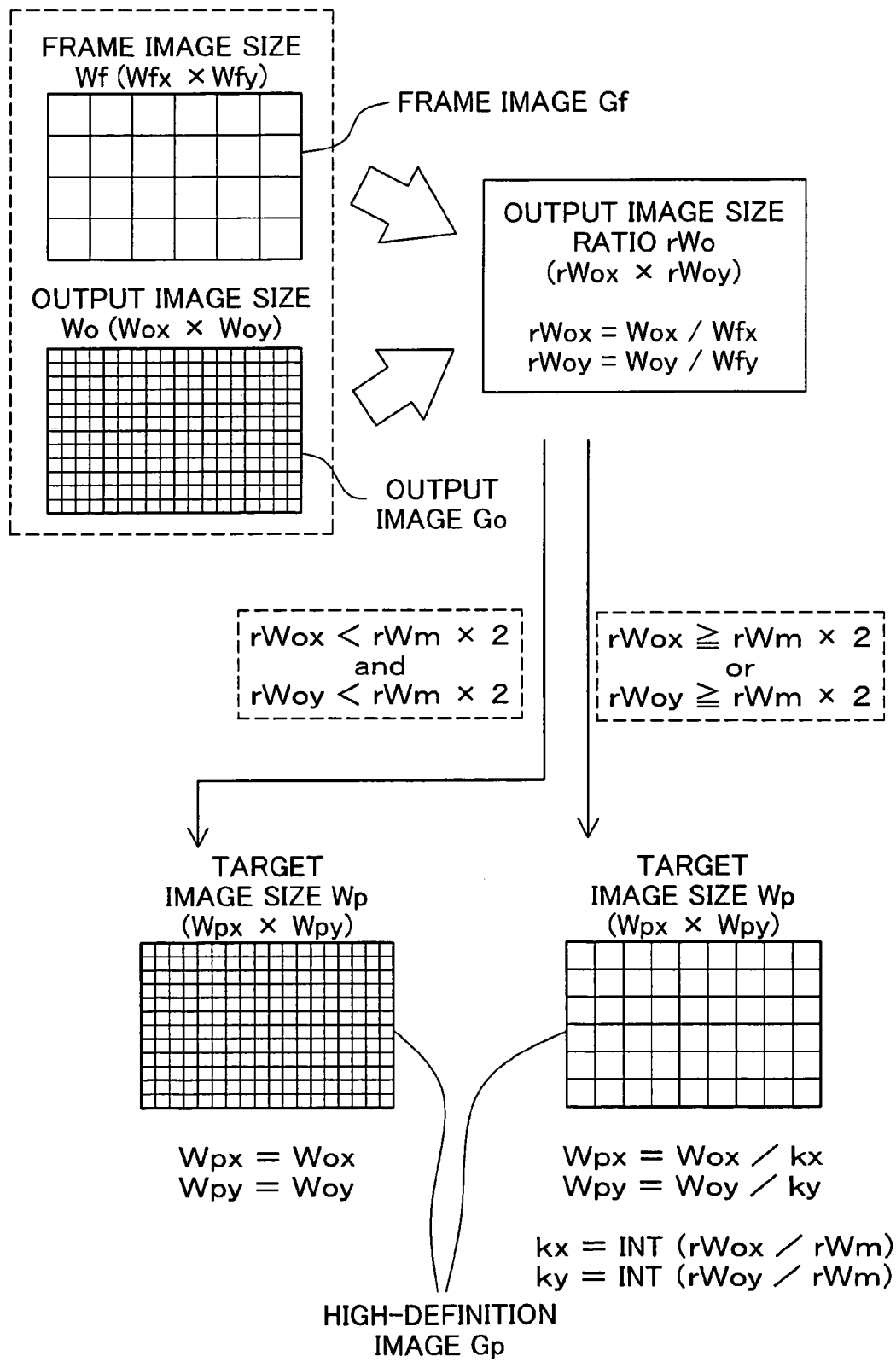
FIG. 6 is an explanatory diagram showing in outline the contents of the processing for setting the target image size Wp.

FIG. 6 is an explanatory diagram showing in outline the contents of the processing for setting the target image size Wp. The top section of FIG. 6 shows a frame image Gf of the frame image size Wf and an output image Go of the output image size Wo. Also, the upper right section of FIG. 6 shows the calculated output image size ratio rWo. The output image size ratio rWo is represented with rWox×rWoy with the horizontal direction as rWox and the vertical direction as rWoy. The output image size rWo is calculated with the following formulas.

$rWox = Wox \times Wfx$ $rWoy = Woy \times Wfy$

Next, the target image size setting unit 15 determines whether the output image size ratio rWo is smaller than a predetermined threshold. In the present embodiment, the predetermined threshold is two times the upper limit of the target image size ratio rWm. Here, the "upper limit of the target image size" means the maximum target image size for which an adequate image improvement can be expected through high-definition image data generation processing when the frame image size of the source moving image is Wf. Also, the ratio of the upper limit of the target image size Wm to the frame image size Wf of the source moving image is referred to as the "upper limit of the target image size ratio rWm". In the present embodiment, the value for the upper limit of the target image size ratio rWm has been found experimentally beforehand and set as the default value. The user may be allowed to set the upper limit of the target image size ratio rWm. The value of the upper limit target image size ratio rWm is preferably from 1.3 to 2.0, and even more preferably from 1.5 to 1.8.

When the determination is made whether the output image size ratio rWo is smaller than the predetermined threshold, if it is, this means that both rWox and rWoy are smaller than the predetermined threshold. Also, if the output image size ratio rWo is at or higher than a predetermined threshold, it means that at least one of rWox and rWoy is at or higher than the predetermined threshold.

If the output image size ratio rWo is smaller than the predetermined threshold (twice the upper limit of the target image size ratio rWm), the target image size setting unit 15 sets the target image size Wp equivalent to the output image size Wo as shown in the lower section of FIG. 6. In further detail, the target image size Wp is calculated with the following formulas.

$$Wpx=Wox$$

$$Wpy=Woy$$

Here, image size conversion processing by the output device is not required when the high-definition image Gp of the target image size Wp is outputted.

If the output image size ratio rWo is at or higher than the predetermined threshold, the target image size setting unit 15 sets the target image size Wp to a value found by dividing the output image size Wo by an adjustment coefficient k as shown in FIG. 6. In further detail, the target image size Wp is calculated with the following formulas.

$$Wpx=Wox/kx$$

$$Wpy=Woy/ky$$

Here, the adjustment coefficient k represents the conversion ratio of the image size for the output device. In further detail, k-multiple image size conversion processing is carried out by the output device during image output, so the adjustment coefficient k is set to control the target image size Wp in high-definition image data generation processing. For the adjustment coefficient k, the horizontal direction is represented by kx and the vertical direction by ky.

The adjustment coefficient k is an adjustment value for which the ratio of the output image size ratio rWo to the upper limit of the target image size ratio rWm is found and everything below the decimal point truncated. In further detail, the adjustment coefficient k is calculated with the following formulas. The function INT(i) represents a function for finding an integral value by truncating below the decimal point.

$$kx=INT(rWox/rWm)$$

$$ky=INT(rWoy/rWm)$$

When the adjustment coefficient k is calculated with the above formulas, it is ordinarily an integer of 2 or larger. If it is determined that either the rWox or rWoy is twice or larger than the upper limit of the target image size ratio rWm, it is possible that either the adjustment coefficient kx or ky will be 1.

In this way, when the output image size ratio rWo is at or above a predetermined threshold, the target image size Wp is set smaller than twice the value of the upper limit of the target image size Wm. Accordingly, when the target image size Wp is set in this manner and high-definition image data generation processing is carried out, adequate effects of image improvement are obtained, and the time required for processing can be controlled.

Also at this time, conversion processing is carried out by the output device at k times the image size during output of the high-definition image Gp, and an image is generated for output processing of the output image size Wo. Here, image conversion processing at k times the image size by the output device can be carried out using a general interpolation method such as bilinear or bicubic processing. For such processing, the adjustment coefficient k is an integral number, so the image size conversion processing increases the image size by an integral multiple; a drop in the image quality can be kept to a minimum, and an increase in the processing time can be controlled.

In step S500 (FIG. 4), the image generation control unit 14 (FIG. 1) sets the high-definition image data generation processing. The setting of the high-definition image data generation processing means making various settings to determine the contents of high-definition image data generation processing. In concrete terms, the image generation control unit 14 carries out the acquisition of information specifying the moving image data (source moving image data) used in processing, the acquisition of information for specifying the basis frame image data, the acquisition of information for specifying subject frame image data used in processing, and the acquisition of set target image size Wp.

In the present embodiment, information for specifying the source moving image data means the data name and the data creation date and time of the moving image data that is selected by the user. Also, the information for specifying the basis frame image data and the information for specifying the subject frame image data mean the absolute frame number. In the present embodiment, the absolute frame number is the sequential number of the moving image data counted from the initial frame image datum in the frame image data.

In step S600, the image composition unit 16 (FIG. 1) carries out image composition processing in accordance with the details set in step S500. In concrete terms, the image composition unit 16 acquires the basis frame image data and subject frame image data (that is, the composition source image data) from the source moving image data stored in the image storage 11, composes the acquired composition source image data, and generates high-definition image data representing the high-definition image Gp of the target image size Wp. Details of the processing to compose the composition source image by the image composition unit 16 are given below.

As described above, the image generation device 10 (FIG. 1) can carry out high-definition image data generation processing to generate high-definition image data representing the high-definition image Gp of the target image size Wp. At this time, the target image size Wp is either equivalent to the output image size Wo or is the value found by dividing the output image size Wo by the integral adjustment coefficient k.

If the target image size Wp is equivalent to the output image size Wo, image size conversion processing is not carried out by the output device when the generated high-definition image Gp is outputted by the output device, so it is possible to prevent the quality of the high-definition image Gp from decreasing during output. Also, if the target image size Wp is a value found by dividing the output image size Wo by an integral number, image size conversion processing is carried out wherein the image size is converted by an integral multiple by the output device during output of the generated high-definition image Gp to the output device, but in general, there is little decrease in image quality in the processing of the image size by an integral multiple, so it is possible to control a drop of image quality of the high-definition image Gp during output.

In this manner, the image generation device 10 can generate image data such that a drop in image quality is controlled during output of the high-definition image to be generated in the high-definition image data generation processing to generate high-definition data that represents a high-definition image from a plurality of frame image data.

Further, either image size conversion processing is not carried out by the output device during output of the high-definition image Gp generated by the image generation device 10, or else only conversion processing to convert the image size by an integral multiple is carried out, so the processing time required for output can be shortened.

A-4. Image Composition Processing

Figure 7:
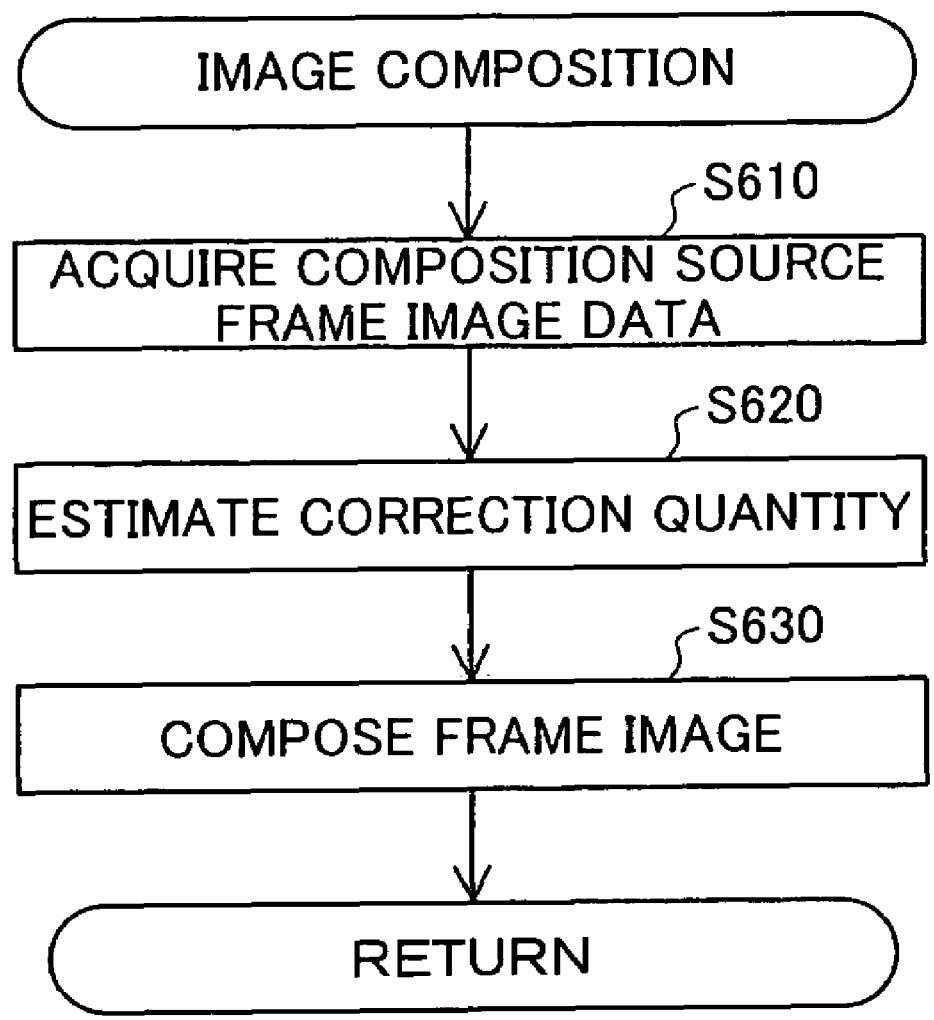
FIG. 7 is a flowchart showing the flow of image composition processing by the image composition unit.

FIG. 7 is a flowchart showing the flow of image composition processing by the image composition unit. In step S610, the image composition unit 16 (FIG. 1) acquires composition source frame image data. As described above, composition source frame image data is frame image data in the source moving image data that is used in the composition of an image; in the present embodiment, the composition source frame image data is the frame image data representing the three frame images Gf, that is the basis frame image F0, the subject frame images F1 and F2. The image composition unit 16 specifies the source moving image data from the image data stored in the image storage 11, and acquires the composition source frame image data from the source moving image data, with reference to the absolute frame number. The composition source frame image data acquired by the image composition unit 16 is temporarily stored in a storage device such as a memory or hard disk (not illustrated).

In step S620, the image composition unit 16 carries out an estimate of the correction amount required to correct discrepancy (positional shift) between the frame images of the acquired composition source frame image data. In this correction amount estimate, the correction amount to correct the positional discrepancies between each of the subject frame images F1 and F2 as compared to the basis frame image F0 is estimated.

Figure 8:
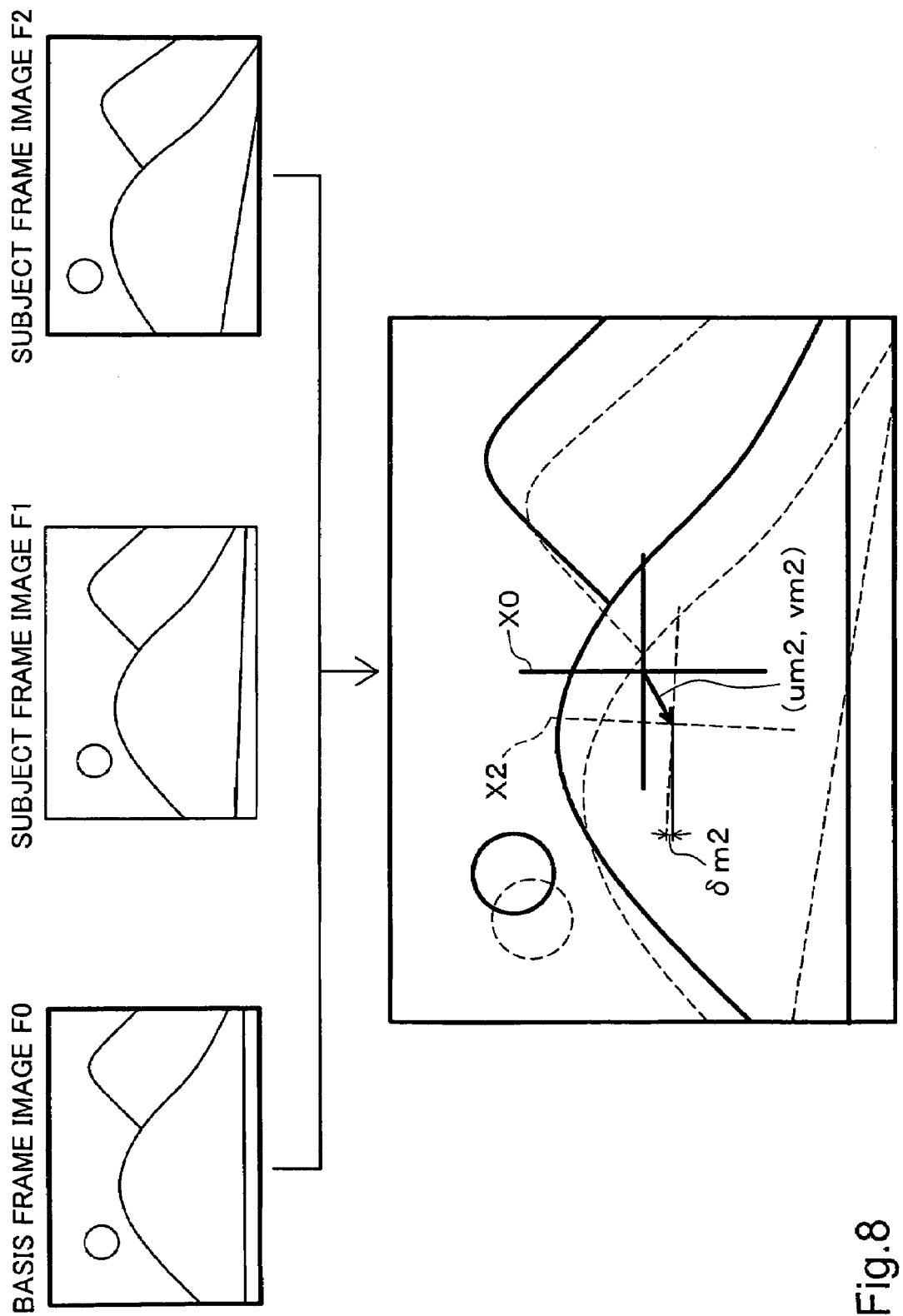
FIG. 8 is an explanatory diagram showing the positional discrepancy between the basis frame image and the subject frame image.
Figure 9:
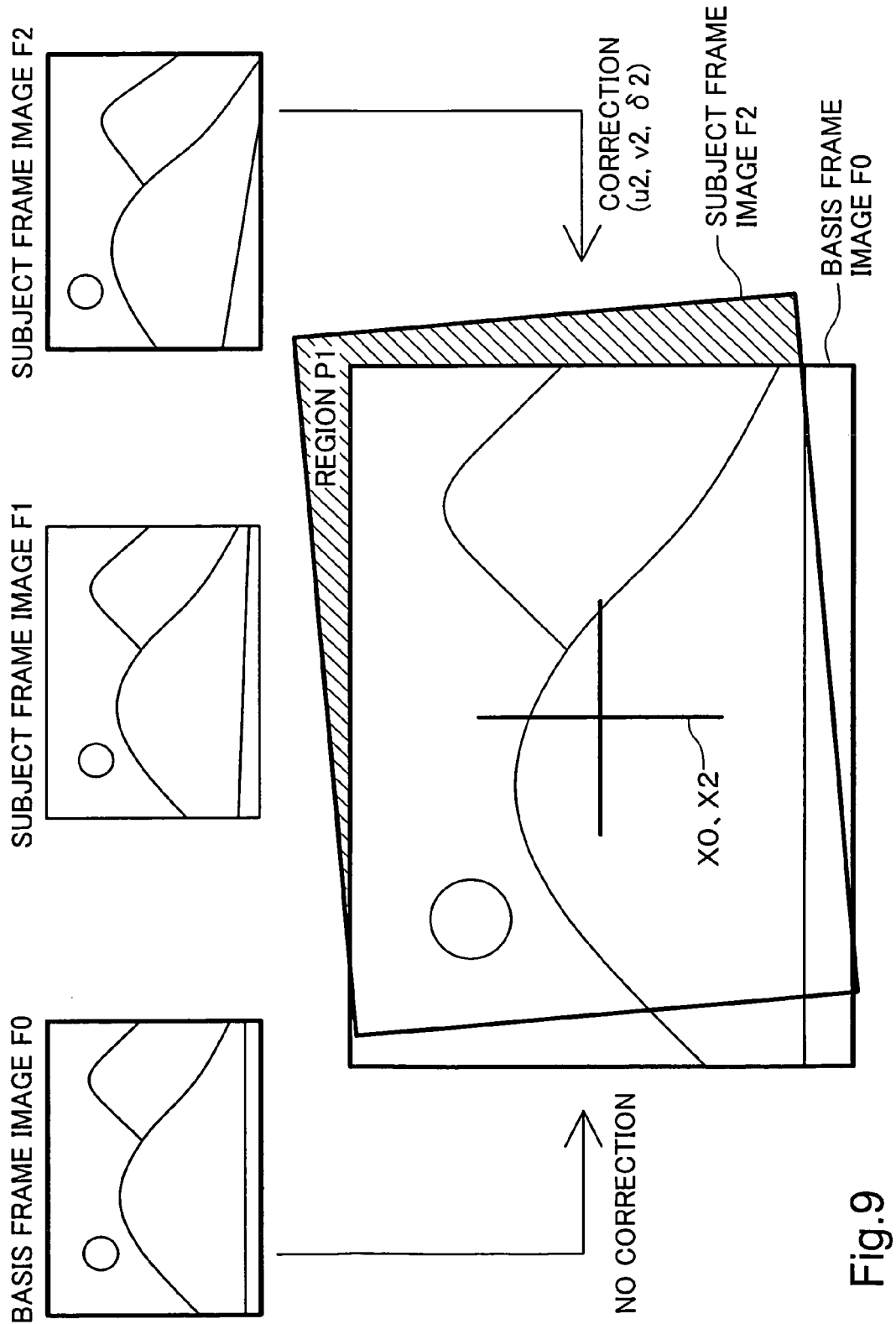
FIG. 9 is an explanatory diagram showing the correction for the positional discrepancy between the basis frame image and the subject frame image.

FIG. 8 is an explanatory diagram showing the positional discrepancy between the basis frame image and the subject frame image. FIG. 9 is an explanatory diagram showing the correction for the positional discrepancy between the basis frame image and the subject frame image.

In the below description, a series of numbers n (n=0, 1, 2) is assigned to the three acquired sets of frame image data, and the frame image data and the frame image representing the frame image data are called using the series number n. In further detail, the frame image data of the series number n is called frame n, and the image representing the frame n is called frame image Fn. For example, the frame image data whose series number n value is 0 is called frame 0, and the image representing frame 0 is called frame image F0.

Here, frame 0 indicates the basis frame image data, and F0 indicates the basis frame image F0. Also, frame 1 and frame 2 indicate the subject frame image data, and F1 and F2 indicate the subject frame images F1 and F2.

The image positional discrepancy is represented with a combination of the translation (in the horizontal or vertical direction) discrepancy and the rotational discrepancy. In FIG. 8, the edge of the basis frame image F0 and the edge of the subject frame image F2 are shown superimposed. Also, an imaginary cross image X0 has been added at the center position on the basis frame image F0; a cross image X0 is displaced similarly to the subject frame image F2, to show a cross image X2, which is the resulting discrepancy image on the subject frame image F2. Also, the basis frame image F0 and the cross image X0 are shown with thick, solid lines, and the subject frame image F2 and the cross image X2 are shown with thin, broken lines.

In the present embodiment, the translation quantity in the horizontal direction is indicated as "um", the translation quantity in the vertical direction as "vm", and the rotational discrepancy quantity as "δm". Also, the discrepancy quantities of the subject frame images Fn (n=1, 2) are indicated as "umn", "vmn", and "δmn". For example, as shown in FIG. 8, the subject frame image F2 has translation discrepancy and rotational discrepancy as compared to the basis frame image F0, whose quantities are respectively indicated as umn, vmn, and δmn.

Here, in order to compose each subject frame image (F1 and F2) with the basis frame image (F0), the positional discrepancy of each pixel of each subject frame image is corrected such as to eliminate the discrepancy between each subject frame image and the basis frame image. The translation correction quantity in the horizontal direction used for this correction is indicated as "u", that translation correction quantity in the vertical direction with "v", and the rotational correction quantity as "δ". Also, the correction quantities of the subject frame images Fn (n=1, 2) are indicated as "un", "vn", and "δn". For example, the correction quantity for the subject frame image F2 is indicated as u2, v2, and δ2.

Here, correction means moving the position of each pixel in the subject frame images Fn (n=1, 2) in the horizontal direction by un, in the vertical direction by vn and rotationally by δn. Accordingly, the correction quantities un, vn, and on for the subject frame images Fn (n=1, 2) are represented with the relationships un=−umn, vn=−vmn, and δn=−δmn. For example, the correction quantities u2, v2, and δ2 for the subject frame image F2 are u2=−um2, v2=−vm2, and δ2=−δm2.

From the description above, it is possible, for example, to eliminate the discrepancy between the subject frame image F2 and the basis frame image F0 by correcting the position of each pixel in the subject frame image F2 using the correction quantities u2, v2, and δ2 as shown in FIG. 9. At this time, if the subject frame image F2 after correction and the basis frame image F0 are displayed on a display (not illustrated), the subject frame image F2 is displayed as partially matching the basis frame image F0 as shown in FIG. 9. To show the results of the correction easily, imaginary cross images X0 and X2 are given in FIG. 9 as in FIG. 8, and as shown in FIG. 9, the results of the correction is that the discrepancy between the cross image X2 and the cross image X0 has been eliminated so they match.

It is similarly possible to correct the subject frame image F1 using the values of the correction quantities u1, v1, and δ1 to change the position of each pixel of the subject frame image F1.

The correction quantities un, vn, and δn for the subject frame images Fn (n=1, 2) are calculated by the image composition unit 16 (FIG. 1) using predetermined calculation formulas based on a pattern match method, a gradient method, or a minimum square method, for example, based on the image data of the basis frame image F0 and the image data for the subject frame images F1 to F2. Then, the calculated correction quantities un, vn, and on are stored in a prescribed region of a memory (not illustrated) as translation correction quantities data un, vn, and rotation correction quantity data δn.

In the present embodiment, the image composition unit 16 corrects the positional discrepancies between the basis frame image F0 and the subject frame images F1 to F2 using the estimated correction quantities un, vn, and δn.

In step S630, the image composition unit 16 (FIG. 1) composes the basis frame image data and the corrected image frame image data to generate high-definition image data representing the high-definition image Gp. At this time, the image composition unit 16 uses pixel data (multi-level data representing multiple tone values) representing pixel values of pixels existing around the generated pixels to carry out a predetermined interpolation processing on pixels constituting the high-definition image Gp to be generated (hereinafter, referred to as the "generation pixels") that do not exist in either the basis frame image or the subject frame image, thereby increasing definition while composing.

Figure 10:
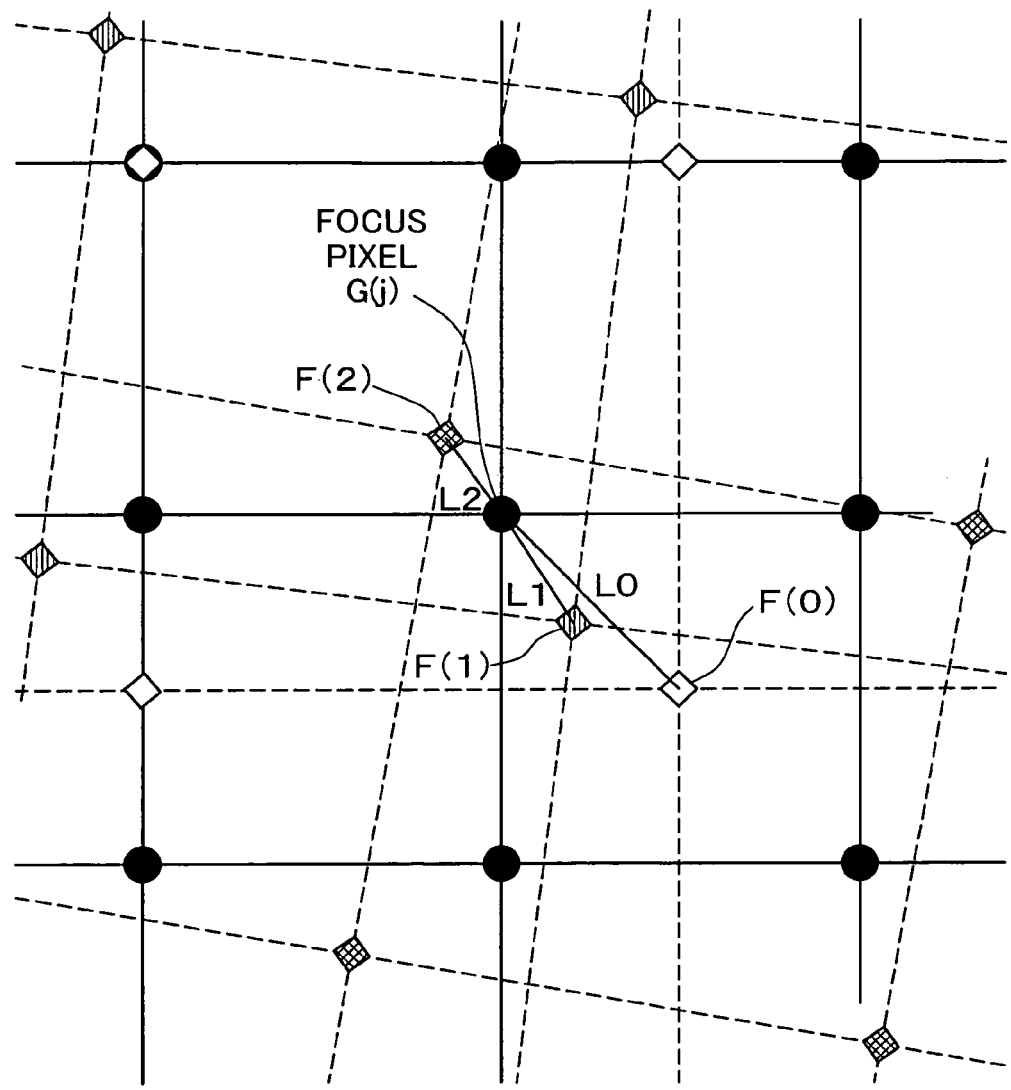
FIG. 10 is an explanatory image showing an enlargement of the basis frame image and the subject frame image arranged with the discrepancy corrected.

FIG. 10 is an explanatory image showing an enlargement of the basis frame image and the subject frame image arranged with the discrepancy corrected. In FIG. 10, the center position of each pixel of the high-definition image Gp is shown as a black circle, the center position of each pixel of the basis frame image F0 is shown as a white quadrilateral, and the center position of each pixel of the subject frame images F1 to F2 after correction is shown as a quadrilateral with hatching. The image size (number of pixels) of the high-definition image Gp is made 1.5 times the image size of the basis frame image F0 both horizontally and vertically. Also, the center of the pixels of the high-definition image Gp is at a position such as to overlap with the center of the pixels of the basis frame image F0 every three pixels. The center of the pixels of the high-definition image Gp does not necessarily have to be positioned such as to overlap with the center of the pixels of the basis frame image F0. For example, the centers of all the pixels of the high-definition image Gp may be positioned between the centers of each pixel of the basis frame image F0, and other positions are possible. Also, the ratio of the image size of the high-definition image Gp and the basis frame image F0 is not limited to 1.5 horizontally and vertically, but may be set to a variety of values.

The following description is focusing on the pixel G(j) in the high-definition image Gp. Here, variable j indicates a number distinguishing all the pixels of the high-definition image Gp; for example, the sequence starts from the pixel at the upper left pixel to the upper right pixel, moves down one line to the left pixel, and then moves to the right pixel, and so forth, to the last pixel. The image composition unit 16 searches for the pixel with the closest distance (hereinafter, referred to as the "nearest pixel") to this pixel (hereinafter, referred to as the "focus pixel").

In concrete terms, the image composition unit 16 calculates distances L0, L1, and L2 between the pixels nearest the focus pixel G(j) (hereinafter, referred to as the nearest pixels) F(0), F(1), and F(2) in the frame images F0, F1, and F2 and the focus pixel G(j), and determines the nearest pixels. For example, in FIG. 10, L2<L1<L0, so the image composition unit 16 determines the pixel F(2) of the subject frame image F2 as the nearest pixel to the focus pixel G(j). The nearest pixel to the focus pixel G(j) is the ith pixel of the subject frame image F2, and is hereinafter written as the nearest pixel F(2, i).

Then, the image composition unit 16 carries out the above procedure on all the pixels in the composition image G in the order j=1, 2, 3, . . . , the numbers of the focus pixels G(j).

Next, the image composition unit 16 uses the determined nearest pixel and the pixel data of other pixels surrounding the focus pixel G(j) in the frame image containing the nearest pixel to generate pixel data of the focus pixel G(j) using various interpolation processes such as a bilinear method, a cubic method, nearest neighbor method, or the like. The description below is an example of interpolation processing using a bilinear method.

Figure 11:
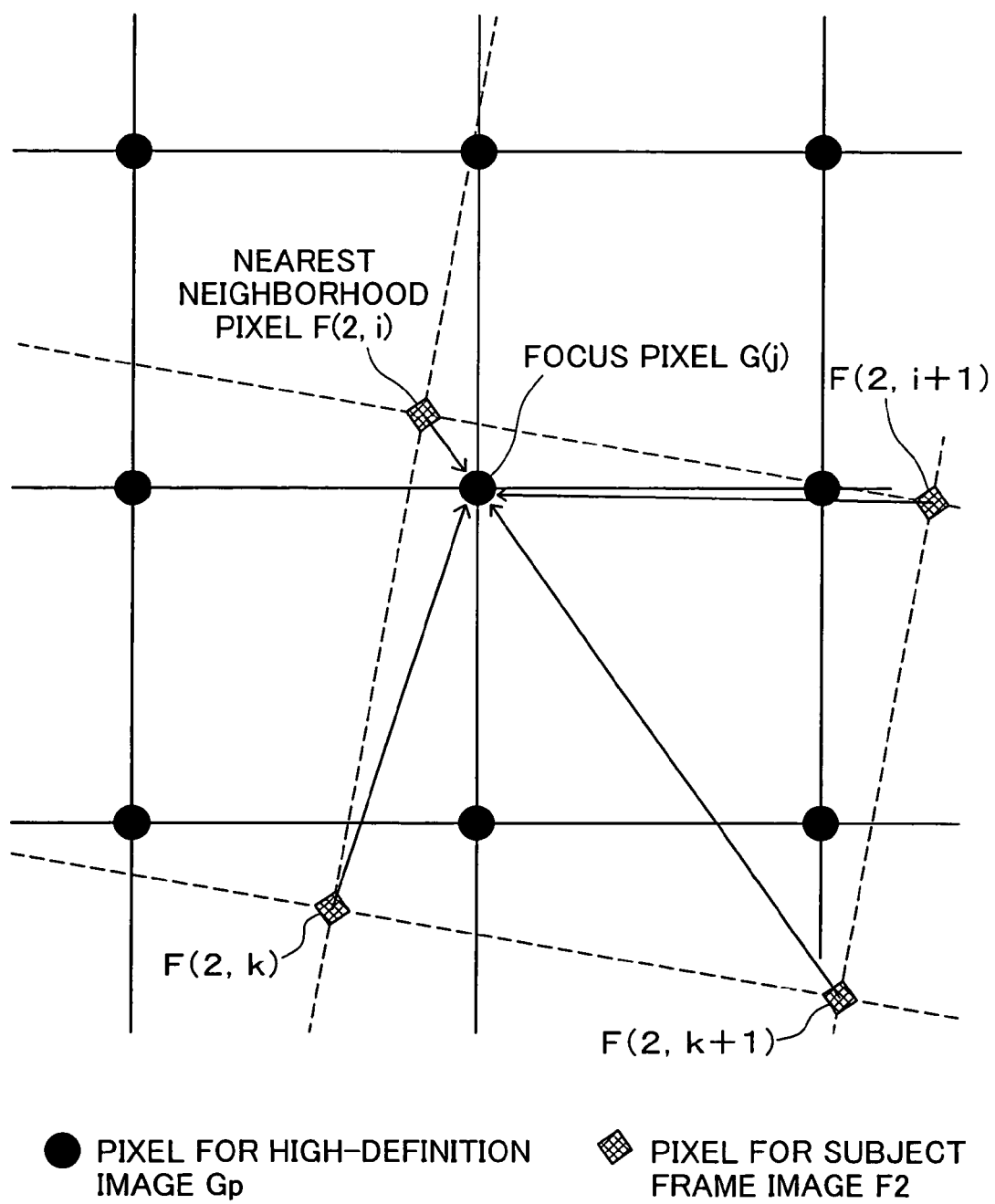
FIG. 11 is an explanatory diagram showing interpolation processing using a bilinear method.

FIG. 11 is an explanatory diagram showing interpolation processing using a bilinear method. The focus pixel G(j) is a pixel not existing in either the basis frame image F0 or the subject frame images F1 to F2 after positional discrepancy correction, so there is no pixel data at that position. Also, as described above, the pixel F(2) of the subject frame image F2 is determined as the nearest pixels F(2, i) of the focus pixel G(j). At this time, the image composition unit 16 carries out interpolation using the nearest pixel F(2, i) and the three pixels F(2, i+1), F(2, k), and F(2, k+1) surrounding the focus pixel G(j) on the subject frame image F2. In the present specification, the nearest pixel F(2, i) and the other three pixels F(2, i+1), F(2, k), and F(2, k+1) are collectively referred to as the surrounding pixels, and the center of the surrounding pixels is referred to as the surrounding pixel center. Also, k indicates the pixel number found by adding the number of pixels in the horizontal direction of the frame image to the ith pixel.

First, the quadrilateral surrounded by the four surrounding pixel centers is divided into four partitions drawn by four lines connecting each surrounding pixel center and the focus pixel G(j). Then, the area of the quadrilateral surrounded by the four surrounding pixels and the areas of the four partitions in the quadrilateral are used to calculate the weighting coefficient of the surrounding pixels. In further detail, the weighting coefficient of a particular surrounding pixel is the ratio of the sum of those two partitions, out of the four, that are not adjacent to the particular surrounding pixel to the area of the quadrilateral surrounded by the four surrounding pixels. Thus, the pixel data of the focus pixel G(j) is calculated by summing the image data of the surrounding pixels multiplied by the respective weighting coefficients.

As described above, in image composition processing, the pixels in the basis frame or subject frame image containing the nearest pixel is used to carry out interpolation processing for the focus pixel, and higher definition is created while carrying out composition. Consequently, it is possible to obtain extremely high quality still images.

B. Embodiment 2

Figure 12:
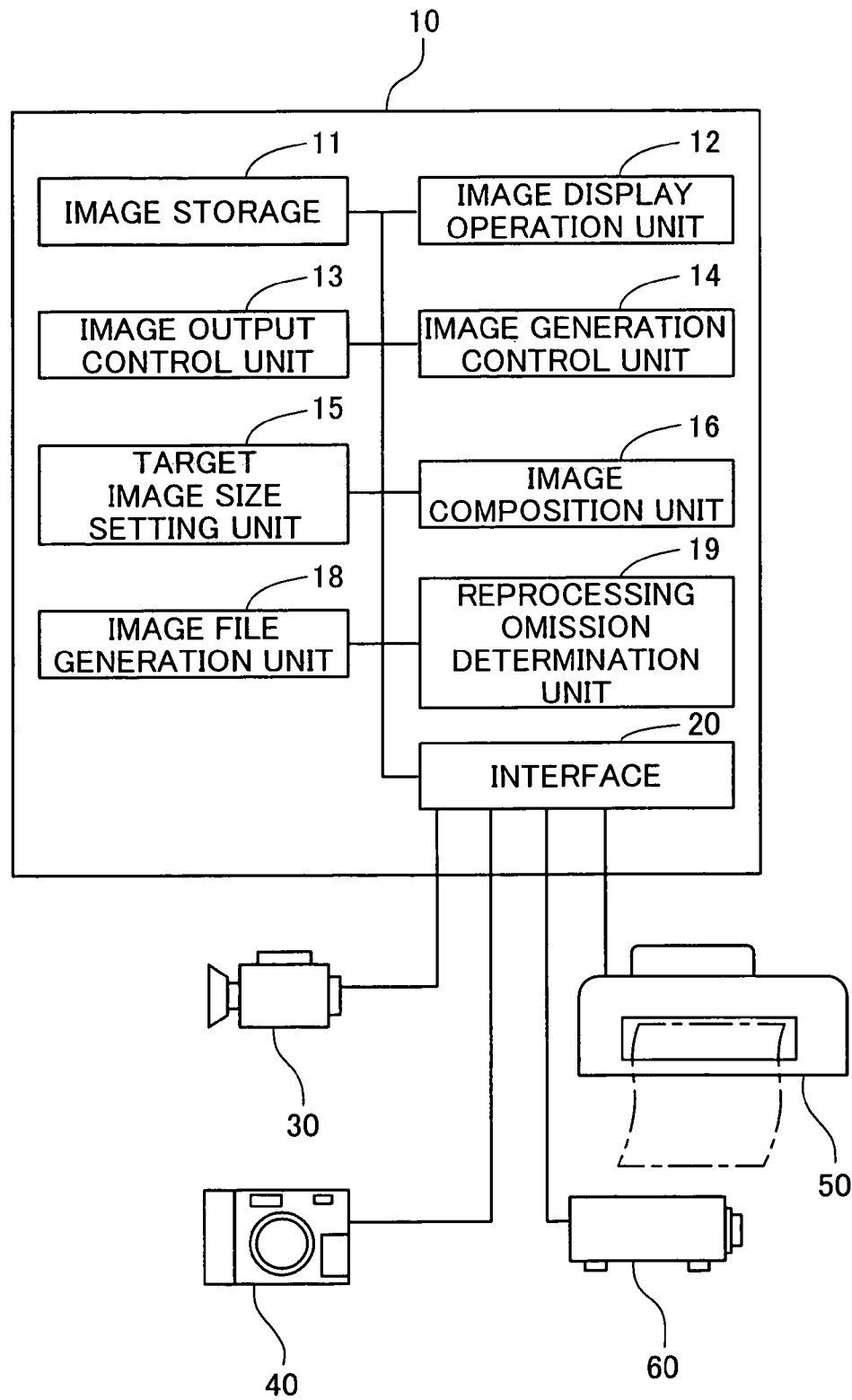
FIG. 12 is an explanatory diagram showing in outline the construction of an image generation device as Embodiment 2 of the present invention.

FIG. 12 is an explanatory diagram showing in outline the construction of an image generation device as embodiment 2 of the present invention. The difference between this and embodiment 1 shown in FIG. 1 is that in the present embodiment, the image generation device 10 comprises an image file generation unit 18 and a reprocessing omission determination unit 19; with respect to other points, the two embodiments are the same. The image file generation unit 18 generates a high-definition image file containing high-definition image data generated in high-definition image data generation processing and high-definition processing specification information for specifying the contents of the high-definition image data generation processing. Also, the reprocessing omission determination unit 19 carries out a reprocessing omission determination described below.

Figure 13:
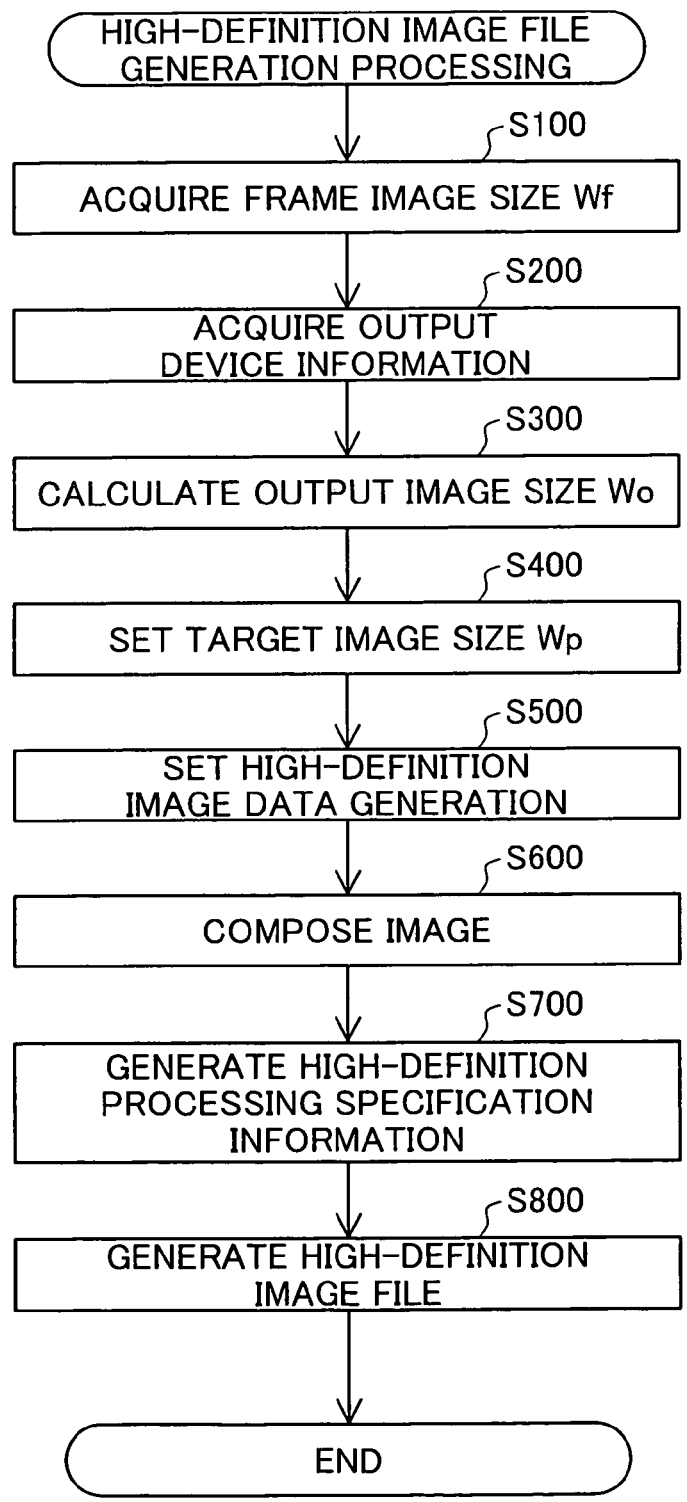
FIG. 13 is a flowchart showing the flow of the high-definition image file generation processing by the image generation device.

FIG. 13 is a flowchart showing the flow of the high-definition image file generation processing by the image generation device. The difference between high-definition image data generation processing here and that in Embodiment 1 shown in FIG. 4 is that in the present embodiment, high-definition processing specification information generation is carried out in step S700 and high-definition image file generation is carried out in step S800; with respect to other points, the high-definition image data generation processing is that same as in Embodiment 1.

In step S700, the image file generation unit 18 (FIG. 12) generates high-definition processing specification information. FIG. 14 is an explanatory diagram showing in outline the contents of the high-definition processing specification information. As described above, the high-definition processing specification information is for specifying the content of the high-definition image data generation processing, and that content includes image processing name information, composition source image data specification information, and image processing setting information.

The image processing name information includes information that a image data is high-definition image data generated in high-definition image data generation processing. Also, the composition source image data specification information includes the source moving image data name and the source moving image data creation date and time for specifying the source moving image data, the frame image size of the source moving image data, the absolute frame number for specifying the basis frame image data, and the absolute frame number for specifying the subject frame image data. Also, the image processing setting information includes the number of frame images and the target image size Wp for image composition.

In step S800 (FIG. 13), the image file generation unit 18 (FIG. 12) generates a high-generation image file. FIG. 15 is an explanatory diagram showing in outline an example of the internal composition of the high-definition image file. A high-definition image file GF comprises an image data storage region 90 for storing high-definition image data and an image data information storage region 80 for storing image data information. Here, image data information means various information related to the high-definition image data and contains high-definition processing specification information. The high-definition image data is stored, for example, in a JPEG format, and the image data information is stored, for example, in a TIFF format. The terms file structure and data structure in the present embodiment mean the structure of the file or data as stored in a storage device.

The high-definition image file GF may basically be provided with the above-mentioned image data storage region 90 and image data information storage region 80, and it may be in a file structure in accordance with a file format already standardized. Below, an instance where the high-definition image file GF according to the present embodiment is applied to a standardized file format is described in concrete terms.

The high-definition image file GF can have a file structure in accordance with the image file format standard for digital still cameras (Exif), for example. The specifications for Exif files are set forth by the Japanese Electronics and Information Technology Industries Association (JEITA). Also, the Exif file format comprises a JPEG image data storage region for storing JPEG-formatted image data, and an associated information storage region for storing various information related to the stored JPEG image data. The JPEG image data storage region corresponds to the image data storage region 90 in FIG. 15, and the associated information storage region corresponds to the image data information storage region 80 in FIG. 15. As is known to a person skilled in the art, a file in an Exif file format uses tags for specifying various data, which is called with the tag names.

The high-definition processing specification information shown in FIG. 14 is stored in the associated information storage region following a stipulated address or offset value. The high-definition processing specification information may be stored in a user-defined region released by the user that is an unidentified region in the associated information storage region, for example.

As described above, the image generation device 10 (FIG. 12) in Embodiment 2 can generate high-definition image files containing high-definition image data and high-definition processing specification information. When a high-definition image file is generated in this manner, reference is made to the high-definition specification information, so that it is known which high-definition image data generation was used to generate the high-definition image data contained in the high-definition image file. This is useful in the following point.

For example, a situation is considered that the user selects a high-definition image file stored in the image storage 11 and outputs the high-definition image data contained in the high-definition image file. The image generation device 10 can be connected to an output device of multiple types (such as a printer and a projector) and model numbers, so if the output device that is the target during high-definition image file generation is different from the output device to be used in the current output, the high-definition image data contained in the high-definition image file is not limited as being suited to only the output device which is to be used. In such a case, the image generation device 10 can refer to the high-definition processing specification information to determine whether the high-definition image data is suited to the output device that is to be used for output.

Also, if the image generation device 10 determines that the high-definition image data is not suited to the output device that is to be used for output, a high-definition image file can be sought that contains high-definition image data suited to the output device and for which the high-definition image data and the image have identicalness. Further, even if a high-definition image file containing high-definition image data suited to the output device is not found by the image generation device 10, a new high-definition image file containing high-definition image data that is suited thereto can be generated.

Figure 16:
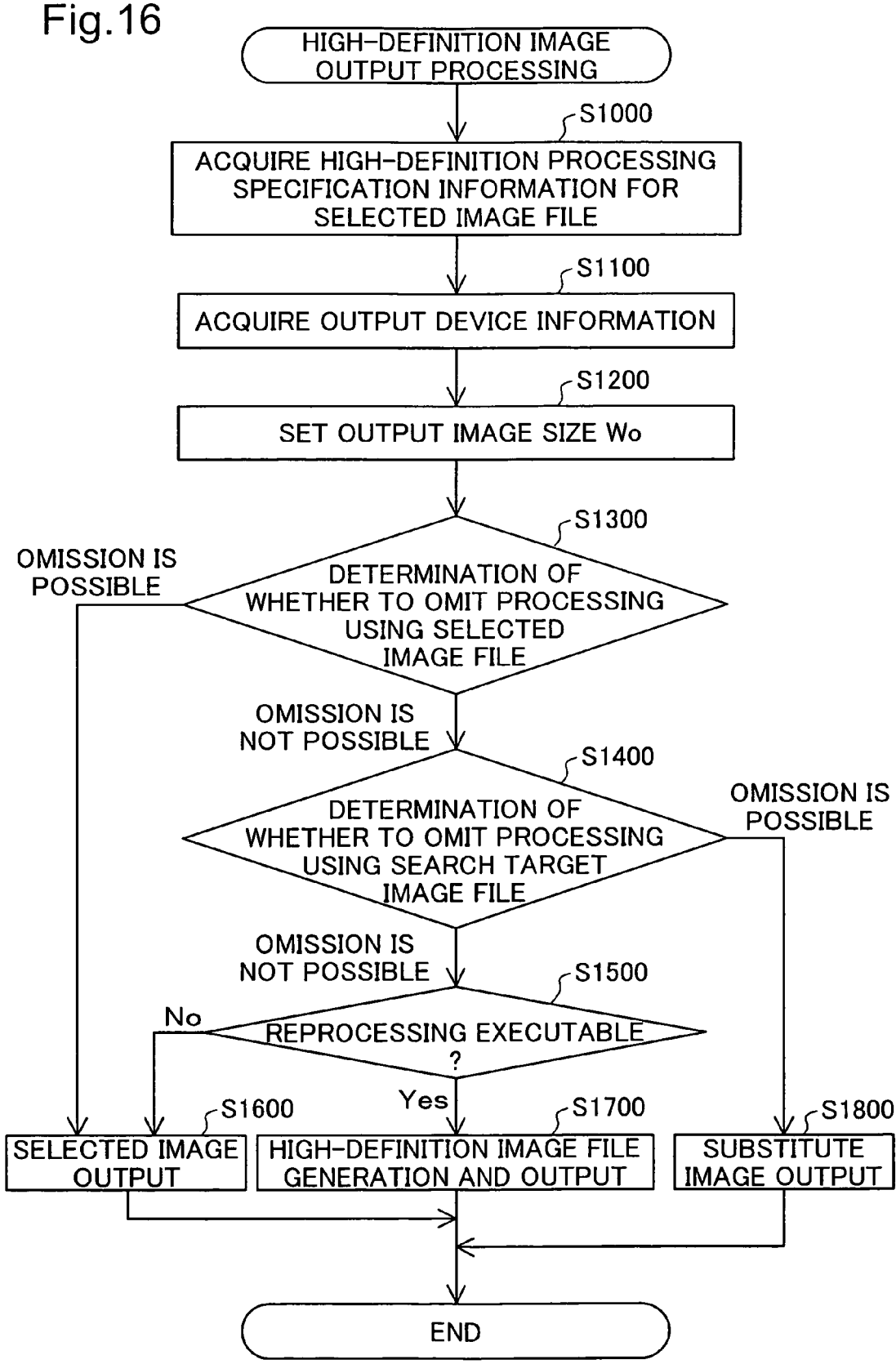
FIG. 16 is a flowchart showing the flow of high-definition image output processing by the image generation device.
Figure 17:
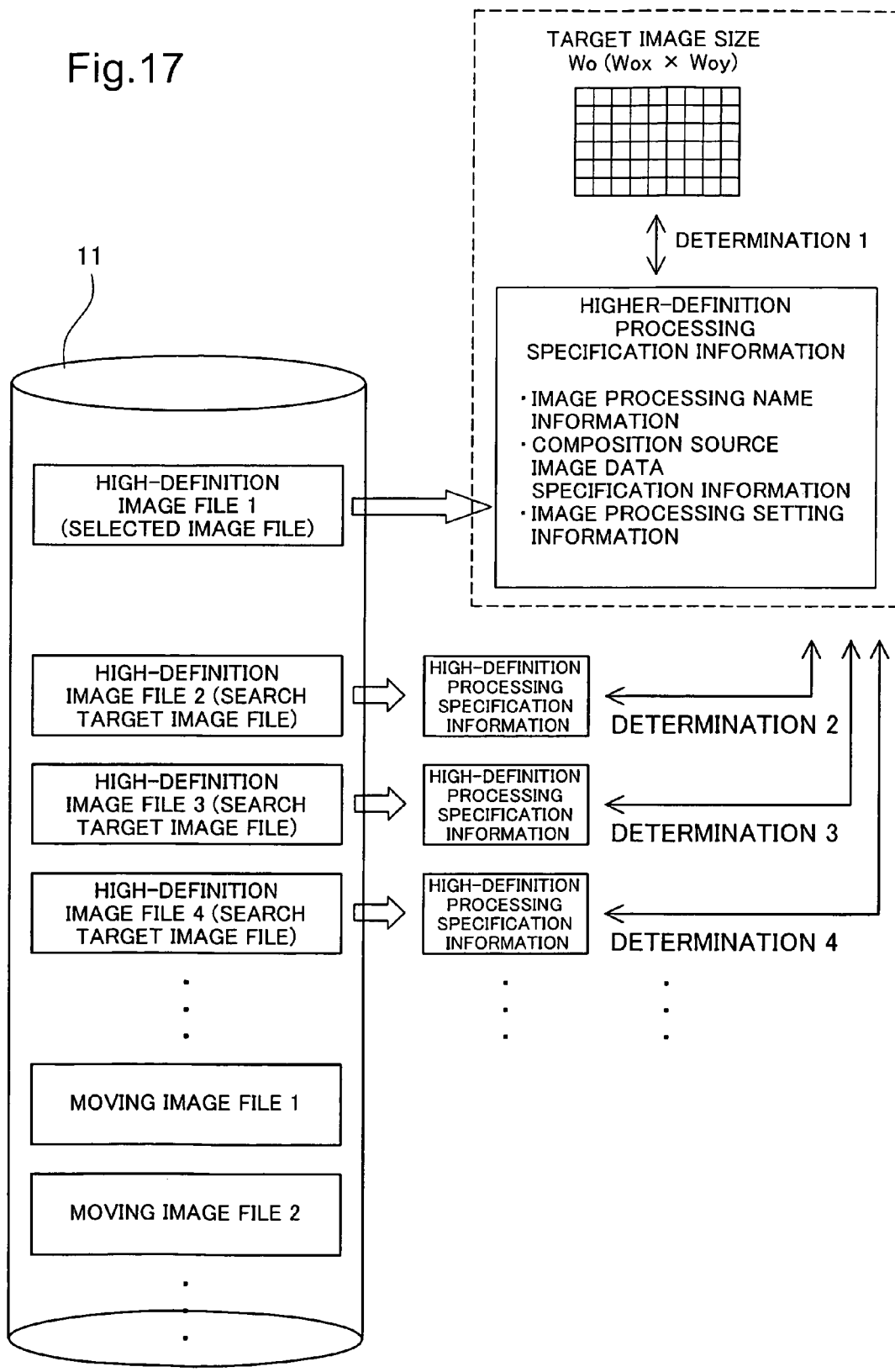
FIG. 17 is an explanatory diagram that shows in outline the high-definition image output processing by the image generation device.

FIG. 16 is a flowchart showing the flow of high-definition image output processing by the image generation device. FIG. 17 is an explanatory diagram that shows in outline the high-definition image output processing by the image generation device. In the present specification, "high-definition image output processing" means processing carried out by the image generation device 10 when the user selects one high-definition image file from those stored in the image storage 11, and operates the high-definition image generation and output button 125 (FIG. 2) to provide an instruction for output. Also, in the present specification, the above-mentioned high-definition image file selected by the user is referred to as the "selected image file".

In step S1000 (FIG. 16), the image output control unit 13 (FIG. 12) acquires the high-definition processing specification information contained in the selected image file. The image storage 11 is shown in the left section of FIG. 17, and the high-definition processing specification information acquired from the selected image file, which is one of the high-definition image files stored in the image storage 11 is shown in the right section.

In step S1100, the target image size setting unit 15 (FIG. 12) acquires output device information. In step S1200, the target image size setting unit 15 sets the output image size Wo based on the output device information. The processing content of the output device information acquisition and the output image size Wo setting by the target image size setting unit 15 is the same as the processing content of steps S200 and S300 of Embodiment 1 shown in FIG. 4. The set output image size Wo is shown in the right section of FIG. 17.

In step S1300, the reprocessing omission determination unit 19 (FIG. 12) makes a reprocessing omission determination according to the selected image file. Here, "reprocessing" means to carry out high-definition image file generation processing to generate a new high-definition image file containing high-definition image data suited to the output device to be used for output, and "reprocessing omission determination" means to determine whether it is possible to output a high-definition image that has already been generated. The reprocessing omission determination in step S1300 is carried out by comparing the high-definition processing specification information of the selected image file and the set output image size Wo; this is shown as determination 1 in FIG. 17.

Figure 18:
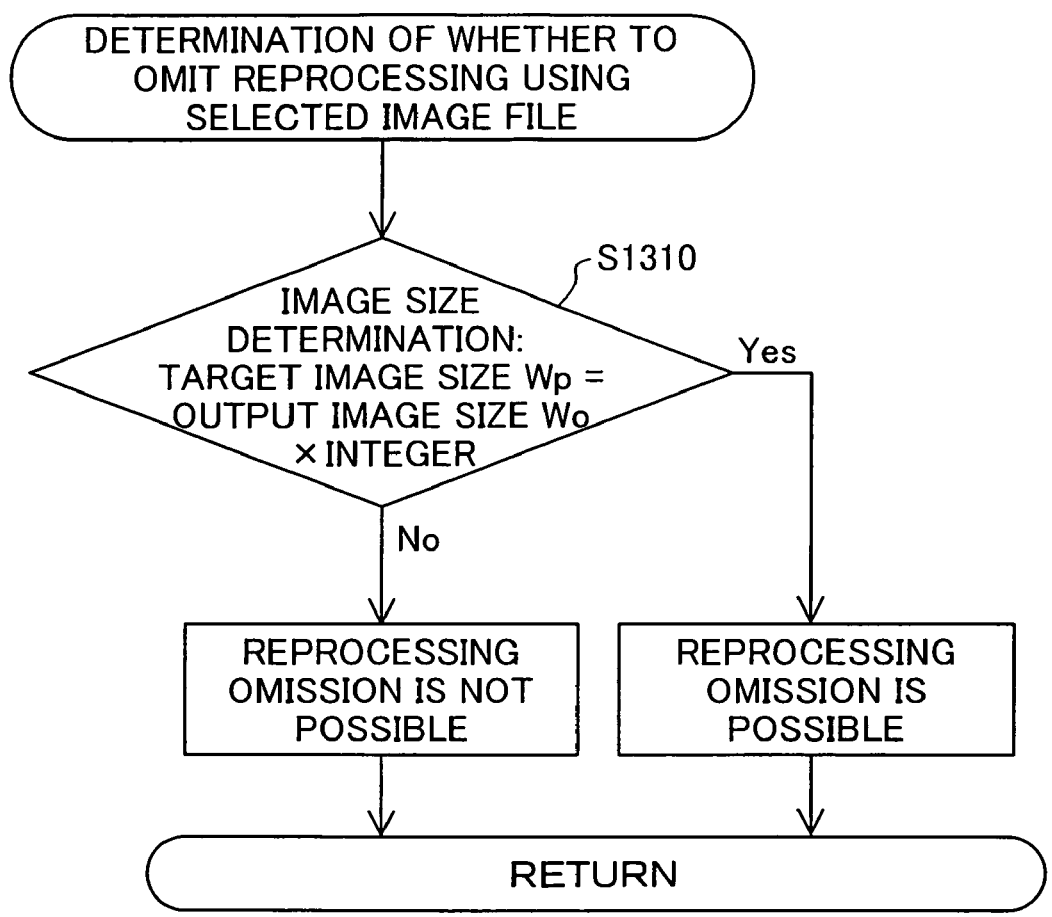
FIG. 18 is a flowchart showing the flow of the processing of the reprocessing omission determination according to the selected image file.

FIG. 18 is a flowchart showing the flow of the processing of the reprocessing omission determination according to the selected image file. In step S1310, the reprocessing omission determination unit 19 carried out a determination of the image size. This image size determination is for whether the target image size Wp contained in the high-definition processing specification information in the selected image file is an integral multiple of the set output image size Wo.

If it is determined that the target image size Wp is an integral multiple of the output image size Wo (step S1310: Yes), the reprocessing omission determination unit 19 determines that reprocessing omission is possible. If the target image size Wp is an integral multiple of the output image size Wo, either image size conversion processing is not carried out by the output device or image size conversion processing is carried out at an integral fraction during output of the high-definition image data contained in the selected image file. Consequently, there is either no drop in image quality during output of the high-definition image data, or the drop is small. Accordingly, in such cases, reprocessing is omitted, and high-definition image data contained in the selected image file can be used in output.

If, on the other hand, it is determined that the target image size Wp is not an integral multiple of the output image size Wo (step S1310: No), the reprocessing omission determination unit 19 determines that reprocessing omission is not possible. If the target image size Wp is not an integral multiple of the output image size Wo, image size conversion processing is carried out by the output device at a non-integral fraction during output of the high-definition image data contained in the selected image file. Consequently, the drop in image quality during high-definition image data output is large. Accordingly, in such cases, it is not possible to omit reprocessing by using the high-definition image data contained in the selected image file for output.

If it is determined in step S1300 (FIG. 16) that reprocessing omission is possible, control proceeds to step S1600, and the image output control unit 13 (FIG. 12) outputs the high-definition image data contained in the selected image file. If it is determined in step S1300 that reprocessing omission is not possible, control proceeds to step S1400.

In step S1400, the reprocessing omission determination unit 19 carries out a reprocessing omission determination based on the search target image file. The reprocessing omission determination in step S1400 is made with the high-definition image file stored in the data storage area in a predetermined search region on a recording medium for storing a plurality of high-definition image files as the search target image file. Then, the high-definition processing specification information contained in the set search target image file, the high-definition processing specification information contained in the selected image file, and the set output image size Wo are compared. In further detail, the processing is carried out by searching in the predetermined search region for a high-definition image file containing high-definition image data suited for the output device and identicalness to the high-definition image data contained in the selected image file. Here, it is possible to set the predetermined search region arbitrarily, though in the present embodiment, the predetermined search region is set within the image storage 11. The high-definition image file stored in the image storage 11 is shown in the left section of FIG. 17, and the reprocessing omission determination carried out with the high-definition image file set as the search target image file is shown in FIG. 17 as determinations 2, 3, 4 . . . .

FIG. 19 is a flowchart showing the flow of processing for the reprocessing omission determination using the search target image file. In step S1410, the reprocessing omission determination unit 19 (FIG. 12) sets the search target image file. Setting of the search target image file is carried out by selecting an arbitrary high-definition image file not yet set as the search target file from the high-definition image files stored in the image storage 11. Here, high-definition image files need to be identified from the image files stored in the image storage 11 in order to set the search target image file. As described above, high-definition image files contain information that is high-definition image data generated in high-definition image data generation processing, so the high-definition image file can be identified based on this information.

In step S1420, the reprocessing omission determination unit 19 acquires high-definition processing specification information contained in the search target file.

In step S1430, the reprocessing omission determination unit 19 carries out a determination of image identicalness. The determination of image identicalness determines whether the high-definition image represented by high-definition image data contained in the search target image file has identicalness with the high-definition image represented by high-definition image data contained in the selected target image file.

In the determination of image identicalness, the high-definition processing specification information contained in the search target image file is compared with the high-definition processing specification information contained in the selected target image file, and a determination is made if there is identicalness with the source moving image data, with the basis frame image, or with the number of composition frames.

In the determination of identicalness of the source moving image data, the reprocessing omission determination unit 19 determines whether there is a match in the source moving image data name or source moving image data creation time and date of both image files, and if there is, it is determined that there is identicalness. In the determination of basis frame image identicalness, the reprocessing omission determination unit 19 determines whether the absolute frame number of the basis frame image data of both image files matches, and if there is a match, it is determined that there is identicalness. In the determination of number of composition frame identicalness, the reprocessing omission determination unit 19 determines there is identicalness if the number of composition frames in both image files matches or if the search target image file has a larger number of composition frames.

If the reprocessing omission determination unit 19 determines there is identicalness in all three, that is, the source moving image data, the basis frame image, and the number of composition frames, it is determined that the images have identicalness. If it is determined there is not identicalness in even one of the three, that is, the source moving image data, the basis frame image, or the number of composition frames, it is determined that the images do not have identicalness.

In the determination of image identicalness in step S1430, if it is determined that there is image identicalness (step S1430: Yes), control proceeds to step S1440. On the other hand, if it is determined there is no image identicalness (step S1430: No), control proceeds to step S1450.

In step S1440, the reprocessing omission determination unit 19 carries out an image size determination. The image size determination determines whether the target image size Wp of the search target image file is an integral multiple of the set output image size Wo. The content of this determination is the same as that of the image size determination in step S1310 of FIG. 18.

In the image size determination of step S1440, if the reprocessing omission determination unit 19 determines the target image size Wp is an integral multiple of the output image size Wo (step S1440: Yes), the reprocessing omission determination unit 19 determines reprocessing omission is possible, and the search target image file that was the object of the determination is set as a substitution image file. If, however, it is determined that the target image size Wp is not an integral multiple of the output image size Wo (step S1440: No), control proceeds to step S1450.

In step S1450, the reprocessing omission determination unit 19 determines whether all of the high-definition image files stored in the image storage 11 are set as search target image files. If it is determined that all the high-definition image files stored in the image storage 11 are set as search target image files (step S1450: Yes), the reprocessing omission determination unit 19 determines that reprocessing omission is not possible. On the other hand, if it is determined that not all of the high-definition image files stored in the image storage 11 are set as search target image files, that is, that there are high-definition image files not yet set as search target image files (step S1450: No), the reprocessing omission determination unit 19 returns to step S1410 and repeats the processing.

In step S1400 (FIG. 16), if it is determined that reprocessing omission is possible, control proceeds to step S1800, and the image output control unit 13 (FIG. 12) outputs the high-definition image data contained in the substitution image file. If it is determined in step S1400 that reprocessing omission is not possible, control proceeds to step S1500.

In step S1500, the reprocessing omission determination unit 19 determines whether reprocessing omission is possible. As described above, reprocessing means to carry out high-definition image file generation processing to generate a new high-definition image file containing high-definition image data suited to the output device used for output. High-definition image file generation processing can be carried out if source moving image data is present with the condition that the processing content is specified. Accordingly, the determination of whether reprocessing is executable is one of whether source moving image data specified by the high-definition processing specification information of the selected image file acquired in step S1000 is present in the image storage 11. In further detail, the reprocessing omission determination unit 19 determines that reprocessing is executable if the source moving image data specified by the source moving image data name and source moving image data creation date and time is present in the image storage 11. If source moving image data is not present in the image storage 11, the reprocessing omission determination unit 19 determines that reprocessing is not executable.

If it is determined in step S1500 that reprocessing is executable (step S1500: Yes), control proceeds to step S1700, and the image generation device 10 (FIG. 12) generates and outputs a high-definition image file. The generation of the high-definition image file in step S1700 is processing that a high-definition image file generation specified by the high-definition processing specification information of the selected image file acquired in step S1000 and the output image size Wo set in step S1200 is executes. The flow of the high-definition image file generation processing is the same as the flow of the processing shown in FIG. 13. Also, the output of the high-definition image file in step S1700 is carried out to output the high-definition image data contained in the generated high-definition image file.

If it is determined in step S1500 that reprocessing is not executable (step S1500: No), control proceeds to step S1600, and the image output control unit 13 (FIG. 12) outputs the high-definition image data contained in the selected image file. The drop in image quality accompanying this high-definition image data is somewhat larger at this time.

As described above, the image generation device 10 can carry out the generation of a high-definition image file containing high-definition image data and high-definition processing specification information. Also, the image generation device 10 of the present embodiment can control an increase in the output processing time while controlling the drop in image quality during output of the high-definition image contained in the high-definition image file.

C. Modifications

The present invention is not limited to the embodiments and aspects described above. The present invention may be worked in various aspects within limits that involve no departure from the spirit of the invention; for example, the following modifications are possible.

C1. Modification 1

In Embodiment 1 described above, the target image size setting unit 15 determines whether the value of the output image size ratio rWo is smaller than a predetermined threshold, and depending on the results of the determination, the setting method of the target image size Wp is altered; but it is also possible for the target image size setting unit 15 to set the target image size Wp as equivalent to the output image size Wo regardless of the value of the output image size ratio rWo. Although there may be cases where the processing time of the high-definition image data generation increases, such a method still makes it possible to control a drop in image quality accompanying output by the output device.

C2. Modification 2

In Embodiment 1 described above, the target image size setting unit 15 determines whether the value of the output image size ratio rWo is smaller than a predetermined threshold, and depending on the results of the determination, the target image size Wp is set, but the target image size setting unit 15 may also determine whether the output image size ratio rWo is smaller than a predetermined threshold and whether it is an integral value, and depending on the results of the determinations, the target image size Wp may be set. In further detail, if the output image size ratio rWo is smaller than a predetermined threshold or is an integral value, the target image size setting unit 15 may set the target image size Wp equivalent to the output image size Wo, and if the output image size ratio rWo is a non-integral number at or above the predetermined threshold, the target image size Wp may be set to a value found by dividing the output image size Wo by an adjustment coefficient k.

At this time, even if the output image size ratio rWo is at or above the predetermined threshold, if it is an integral value, the target image size Wp is set equivalent to the output image size Wo. Here, when the output image size ratio rWo is an integral value, the time required for high-definition image data generation processing is comparatively shorter. Consequently, when the output image size ratio rWo is an integral value at or above a threshold value, an increase in the processing time may be controlled and effects of image quality improvement may be obtained even if the target image size Wp is set equivalent to the output image size Wo.

C3. Modification 3

In Embodiment 1 described above, the target image size setting unit 15 sets the target image size Wp with reference to the output image size Wo set based on the output device information of the output device, but the target image size setting unit 15 may also set the target image size Wp according to the type of the output device contained in the device information. In further detail, the target image size setting unit 15 may detect the output device type, such as a printer or projector, used for output and set the target image size Wp.

For example, if the output device is a "printer", high-definition image quality may be required as the printed material, the output results, might be examined closely or saved. If the output device is a "projector", however, definition as high as for a printer is unlikely to be required as the projection on a screen or the like, the output results, is transient. In this manner, the use form of the output results generally differs depending on the type of output device, so the target image size setting unit 15 required will often be decided in a certain range depending on the output device. Consequently, the target image size setting unit 15 may set the target image size Wp depending on the type of output device. This makes it possible to increase the processing speed of setting the target image size Wp, and makes it possible to generate high-definition image data somewhat suited to the output device even if output device information other than the output device type cannot be acquired. Further, it is possible for the user to arbitrarily set the correspondence relationship between the output device type and the set target image size Wp.

C4. Modification 4

The high-definition processing specification information in Embodiment 2 described above may include output device specification information for specifying the output device that is the object when executing high-definition image file generation processing. By doing this, it is possible to use output device specification information in the reprocessing omission determination during high-definition image output processing. For example, if the output device specified by the output device specification information in the selected file has identicalness to the output device used for output, the reprocessing omission determination unit 19 can then determine in the reprocessing omission determination using the selected image file that reprocessing omission is possible.

Also, the determination of identicalness of the output device may be carried out with a comparison of only the output device type. An item for comparing the output device model may also be added. Further, an item for comparing the print resolution or the like for a printer or the projection image size for a projector may also be added.

C5. Modification 5

In Embodiment 2 described above, the reprocessing omission determination unit 19 determines the identicalness of the basis frame using the absolute frame number in the determination of frame identicalness during reprocessing omission determination, but it is also possible for the reprocessing omission determination unit 19 to make the determination of identicalness of the basis frame image using the similarity of the absolute frame number. Here, the similarity of the absolute frame number means that the absolute frame number is within a predetermined range that contains certain basis numbers.

In general, the temporal interval of a series of frame images constituting a moving image is extremely short, at one divided by tens of seconds. Thus, it is often the case that the contents of multiple frame images where the absolute frame numbers are within a predetermined range are extremely similar, such that they can be said to be within the scope of identicalness. Thus, even if the reprocessing omission determination unit 19 makes a determination of the identicalness of the basis frame image based on the similarity (that the absolute frame number is within a predetermined range including a basis number) of the absolute frame number, identicalness of the image can often be ensured. This is preferable as the conditions for determining whether reprocessing omission is possible are relaxed, and the number of cases where reprocessing can be omitted increased.

C6. Modification 6

In Embodiment 1 described above, the target image size setting unit 15 acquires output device information through a connection cable, but it is also possible for the target image size setting unit 15 to acquire output device information through another communication means such as wireless communication.

C7. Modification 7

In the high-definition image output processing of Embodiment 2 described above, it is also possible for the user to be notified that the reprocessing omission determination unit 19 has determined to carry out high-definition image file generation processing again by, for example, displaying the gist thereof on the display screen 120. Further, at that point, it is also possible to allow the user to select whether to carry out the high-definition image file generation processing again.

C8. Modification 8

In the high-definition image output processing of Embodiment 2 described above, an image is outputted after the reprocessing omission determination unit 19 makes a reprocessing omission determination, but if, for example, the output device is a projector, it is possible to temporarily output high-definition image data contained in the selected image file until the results of the reprocessing omission determination by the reprocessing omission determination unit 19 emerge, and to switch to the high-definition image data used for output when necessary after the reprocessing omission determination results emerge.

C9. Modification 9

In Embodiment 2 described above, a high-definition processing image file containing high-definition processing specification information and high-definition image data is generated, but it is also possible to generate separate files that are associated without needing to have the high-definition processing specification information and the high-definition image data in the same file.

C10. Modification 10

In Embodiment 2 described above, the content of the high-definition processing specification information described is one example, and may be set arbitrarily.

C11. Modification 11

In the embodiments described above, data for a plurality of frame images were used that constitute a moving image to describe an example for generating high-definition image data, but it is also possible to use data other than frame image data to generate high-definition image data. For example, generation of high-definition image data may be made using a data for a plurality of still images.

C12. Modification 12

In the embodiments described above, the three parameters of translation discrepancy (horizontal u and vertical v) and rotational discrepancy ($\delta$) were used to estimate the correction quantity in the estimation of the discrepancy correction quantity for the overall image, but the present invention is not limited thereto. For example, the number of parameters may be changed and the correction quantity estimated, or other types of parameters may be used to estimate the correction quantity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image generation device for generating high-definition image data representing a high-definition image higher in definition than images represented by a plurality of image data, the device comprising:
   a target image size setting module configured to acquire output device information relating to an output device used in output of the high-definition image, and set a target image size expressed with number of pixels of the high-definition image suited for outputting by the output device based on the output device information, the target image size setting module setting the target image size with reference to an output image size set based on the output device information; and
   an image composing module configured to select a plurality of source image data arranged in a time sequence from the plurality of image data, and compose the source image data to generate high-definition image data representing a high-definition image with the target image size,
   wherein the target image size setting module calculates a ratio of the output image size and a size of an image represented by the source image data as an output image size ratio, sets the target image size equivalent to the output image size if the output image size ratio is smaller than a predetermined threshold, and sets the target image size to a value found by dividing the output image size by an adjustment coefficient value larger than 1 if the output image size ratio is above the predetermined threshold.

2. The image generation device according to claim 1, wherein
   the plurality of image data is series frame image data in a time series constituting a moving image.

3. An image generation device for generating high-definition image data representing a high-definition image higher in definition than images represented by a plurality of image data, the device comprising:
   a target image size setting module configured to acquire output device information relating to an output device used in output of the high-definition image, and set a target image size expressed with number of pixels of the high-definition image suited for outputting by the output device based on the output device information, the target image size setting module setting the target image size with reference to an output image size set based on the output device information; and
   an image composing module configured to select a plurality of source image data arranged in a time sequence from the plurality of image data, and compose the source image data to generate high-definition image data representing a high-definition image with the target image size,
   wherein the target image size setting module calculates a ratio of the output image size and a size of an image represented by the source image data as an output image size ratio, sets the target image size equivalent to the output image size if the output image size ratio is smaller than a predetermined threshold or if the output image size ratio is an integer value, and sets the target image size to a value found by dividing the output image size by an adjustment coefficient value larger than 1 if the output image size ratio is a non-integral value at or the output image size ratio is above the predetermined threshold.

4. An image generation device for generating high-definition image data representing a high-definition image higher in definition than images represented by a plurality of image data, the device comprising:
   a target image size setting module configured to acquire output device information relating to an output device used in output of the high-definition image, and set a target image size expressed with number of pixels of the high-definition image suited for outputting by the output device based on the output device information, the target image size setting module setting the target image size with reference to an output image size set based on the output device information;
   an image composing module configured to select a plurality of source image data arranged in a time sequence from the plurality of image data, and compose the source image data to generate high-definition image data representing a high-definition image with the target image size;
   an image file generating module configured to generate a high-definition image file including high-definition processing specification information and the high-definition image data, the high-definition processing specification information including the target image size and information for specifying the source image data; and
   a reprocessing omission determining module configured to retrieve high-definition processing specification information from a high-definition image file selected by a user to be output by an output device, and determine whether or not to omit re-execution of the high- definition image data generation processing on the high-definition processing specification information of the selected high-definition image file,
   wherein the image composing module executes the high-definition image data generation processing again on the selected high-definition image file if the reprocessing omission determining module determines not to omit the high-definition image data generation processing,
   wherein the image generation device is connectable to a plurality of output devices, and wherein the target image size setting module acquires information relating to a selected one of the plurality of output devices used in outputting the high- definition image data as the output device information.

5. The An image generation device according to claim 4, wherein
   the reprocessing omission determining module determines that the re-execution of the high-definition image data generation processing can be omitted if a target image size in the high-definition processing specification information included in the selected image file is an integral multiple of the output image size.

6. The image generation device according to claim 4, wherein
   the reprocessing omission determining module sets a high-definition image file stored in a data storage area in a predetermined search region on a recording medium for storing a plurality of high-definition image files as a search target image file,
   and wherein the reprocessing omission determining module determines that the re- execution of the high-definition image data generation processing can be omitted
   (i) if there is substantial identicalness between high-definition image data included in the selected image file and high-definition image data included in the search target image file based on the information for specifying source image data in the high-definition processing specification information included in both the selected image file and the search target image file, and (ii) if the target image size in the high-definition processing specification information included in the search target image file is an integral multiple of the output image size.

7. An image generation method of generating high-definition image data representing a high-definition image higher in definition than images represented by a plurality of image data, the method comprising the steps of:
   (a) acquiring output device information relating to an output device used in output of the high-definition image;
   (b) setting a target image size expressed with number of pixels of the high-definition image suited for outputting by the output device based on the output device information, the setting of the target image size including setting the target image size with reference to an output image size set based on the output device information;
   (c) selecting a plurality of source image data arranged in a time sequence from the plurality of image data; and
   (d) composing the source image data to generate high-definition image data representing a high-definition image with the target image size,
   wherein the step (b) includes the step of calculating a ratio of the output image size and a size of an image represented by the source image data as an output image size ratio, setting the target image size equivalent to the output image size if the output image size ratio is smaller than a predetermined threshold, and setting the target image size to a value found by dividing the output image size by an adjustment coefficient value larger than 1 if the output image size ratio is above the predetermined threshold.

8. The image generation method according to claim 7, wherein the plurality of image data is series frame image data in a time series constituting a moving image.

9. An image generation method of generating high-definition image data representing a high-definition image higher in definition than images represented by a plurality of image data, the method comprising the steps of:
   (a) acquiring output device information relating to an output device used in output of the high-definition image;
   (b) setting a target image size expressed with number of pixels of the high-definition image suited for outputting by the output device based on the output device information, the setting of the target image size including setting the target image size with reference to an output image size set based on the output device information;
   (c) selecting a plurality of source image data arranged in a time sequence from the plurality of image data; and
   (d) composing the source image data to generate high-definition image data representing a high-definition image with the target image size,
   wherein the step (b) includes the step of calculating a ratio of the output image size and a size of an image represented by the source image data as an output image size ratio, setting the target image size equivalent to the output image size if the output image size ratio is smaller than a predetermined threshold or if the output image size ratio is an integer value, and setting the target image size to a value found by dividing the output image size by an adjustment coefficient value larger than 1 if the output image size ratio is a non-integral value at or the output image size ratio is above the predetermined threshold.

10. An image generation method of generating high-definition image data representing a high-definition image higher in definition than images represented by a plurality of image data, the method ftwther comprising the steps of:
    (a) acquiring output device information relating to an output device used in output of the high-definition image, the acquiring of output device information including acquiring information relating to a selected one of a plurality of output devices used in outputting the high-definition image data as the output device information;
    (b) setting a target image size expressed with number of pixels of the high-definition image suited for outputting by the output device based on the output device information, the setting of the target image size including setting the target image size with reference to an output image size set based on the output device information;
    (c) selecting a plurality of source image data arranged in a time sequence from the plurality of image data;
    (d) composing the source image data to generate high-definition image data representing a high-definition image with the target image size;
    (e) generating a high-definition image file including high-definition processing specification information and the high-definition image data, the high-definition processing specification information including the target image size and information for specifying the source image data;
    (f) retrieving high-definition processing specification information from a high-definition image file selected by a user to be output by an output device; and
    (g) determining whether or not to omit re-execution of the high-definition image data generation processing on the high-definition processing specification information of the selected high-definition image file,
    wherein the step (d) includes the step of executing the high-definition image data generation processing again on the selected high-definition image file if the re-execution of the high-definition image data generation processing is determined not to be omitted at the step (g).

11. The An image generation method according to claim 10, wherein the step (g) includes the step of determining that the re-execution of the high-definition image data generation processing can be omitted if a target image size in the high-definition processing specification information included in the selected image file is an integral multiple of the output image size.

12. The An image generation method according to claim 10, wherein the step (g) includes the step of setting a high-definition image file stored in a data storage area in a predetermined search region on a recording medium for storing a plurality of high-definition image files as a search target image file,
    and wherein the step (g) includes the step of determining that the re-execution of the high-definition image data generation processing can be omitted
    (i) if there is substantial identicalness between high-definition image data included in the selected image file and high-definition image data included in the search target image file based on the information for specifying source image data in the high-definition processing specification information included in both the selected image file and the search target image file, and
    (ii) if the target image size in the high-definition processing specification information included in the search target image file is an integral multiple of the output image size.

13. A computer program product for generating high-definition image data representing a high-definition image higher in definition than an images represented by a plurality of image data, the computer program product comprising:
  a computer readable medium; and
  a computer program stored on the computer readable medium, the computer program comprising:
  a first program for acquiring output device information relating to an output device used in output of the high-definition image, and setting a target image size expressed with number of pixels of the high-definition image suited for outputting by the output device based on the output device information, the first program setting the target image size with reference to an output image size set based on the output device information; and
  a second program for selecting a plurality of source image data arranged in a time sequence from the plurality of image data and composing the source image data to generate high-definition image data representing a high-definition image with the target image size,
  wherein the first program calculates a ratio of the output image size and a size of an image represented by the source image data as an output image size ratio, sets the target image size equivalent to the output image size if the output image size ratio is smaller than a predetermined threshold, and sets the target image size to a value found by dividing the output image size by an adjustment coefficient value larger than 1 if the output image size ratio is above the predetermined threshold.

* * * * *